United States Patent
Barito et al.

(10) Patent No.: US 9,702,352 B2
(45) Date of Patent: *Jul. 11, 2017

(54) LINEAR COMPRESSOR AND A SPRING ASSEMBLY

(71) Applicant: Haier US Appliance Solutions, Inc., Wilmington, DE (US)

(72) Inventors: Thomas R. Barito, Louisville, KY (US); Gregory William Hahn, Mount Washington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/524,165

(22) Filed: Oct. 27, 2014

(65) Prior Publication Data

US 2016/0115948 A1     Apr. 28, 2016

(51) Int. Cl.
  *F04B 35/04* (2006.01)
  *F16F 1/02* (2006.01)

(52) U.S. Cl.
  CPC ............ *F04B 35/04* (2013.01); *F04B 35/045* (2013.01); *F16F 1/025* (2013.01)

(58) Field of Classification Search
  CPC .......... F04B 35/04; F04B 35/045; F16F 1/025
  USPC .......................... 417/417; 267/221, 250, 275
  See application file for complete search history.

(56) References Cited

U.S. PATENT DOCUMENTS

| 2,917,303 | A | * | 12/1959 | Vierling | B60G 15/06 188/314 |
| 3,096,084 | A | * | 7/1963 | Osterhoudt | F16F 13/02 267/218 |
| 3,588,291 | A | * | 6/1971 | Curwan | F04B 35/045 417/417 |
| 5,146,124 | A | | 9/1992 | Higham et al. | |
| 5,525,845 | A | | 6/1996 | Beale et al. | |
| 5,944,302 | A | * | 8/1999 | Loc | F04B 35/045 267/180 |
| 6,812,597 | B2 | | 11/2004 | McGill et al. | |
| 6,946,754 | B2 | | 9/2005 | Inagaki et al. | |
| 7,614,856 | B2 | | 11/2009 | Inagaki et al. | |
| 7,618,243 | B2 | | 11/2009 | Tian et al. | |
| 8,011,183 | B2 | | 9/2011 | Berchowitz | |
| 8,127,560 | B2 | | 3/2012 | Dicken | |
| 8,177,523 | B2 | | 5/2012 | Patel et al. | |
| 8,241,015 | B2 | | 8/2012 | Lillie et al. | |
| 8,378,218 | B2 | * | 2/2013 | Dicken | H01R 13/2421 174/126.1 |
| 8,998,589 | B2 | * | 4/2015 | Lilie | F04B 35/045 417/410.1 |

(Continued)

FOREIGN PATENT DOCUMENTS

EP 0620367 4/1993
WO WO 2005/028841 3/2005

(Continued)

*Primary Examiner* — Charles Freay
(74) *Attorney, Agent, or Firm* — Dority & Manning, P.A.

(57) ABSTRACT

A linear compressor is provided. The linear compressor includes a spring assembly. An inner back iron assembly is fixed to the spring assembly at a middle portion of the spring assembly. A driving coil is operable to move the inner back iron assembly in order to reciprocate a piston within a chamber of a cylinder assembly. A related spring assembly is also provided.

19 Claims, 18 Drawing Sheets

(56) References Cited

U.S. PATENT DOCUMENTS

| 9,429,150 B2* | 8/2016 | Barito ................ F04B 39/0005 |
| 2006/0127249 A1* | 6/2006 | Lilie .................... F04B 35/045 |
| | | 417/417 |
| 2006/0171822 A1 | 8/2006 | Seagar et al. |
| 2009/0039655 A1 | 2/2009 | Berchowitz |
| 2009/0094977 A1 | 4/2009 | Hill |
| 2009/0263262 A1 | 10/2009 | McGill |
| 2011/0056196 A1 | 3/2011 | Berchowitz et al. |
| 2011/0058960 A1 | 3/2011 | Bernhard Lilie et al. |
| 2011/0064593 A1* | 3/2011 | Kang .................. F04B 35/045 |
| | | 417/410.1 |
| 2012/0177513 A1 | 7/2012 | Lilie et al. |

FOREIGN PATENT DOCUMENTS

| WO | WO 2006/013377 | 2/2006 |
| WO | WO 2006/081642 | 2/2006 |
| WO | WO 2013/003923 | 1/2013 |

\* cited by examiner

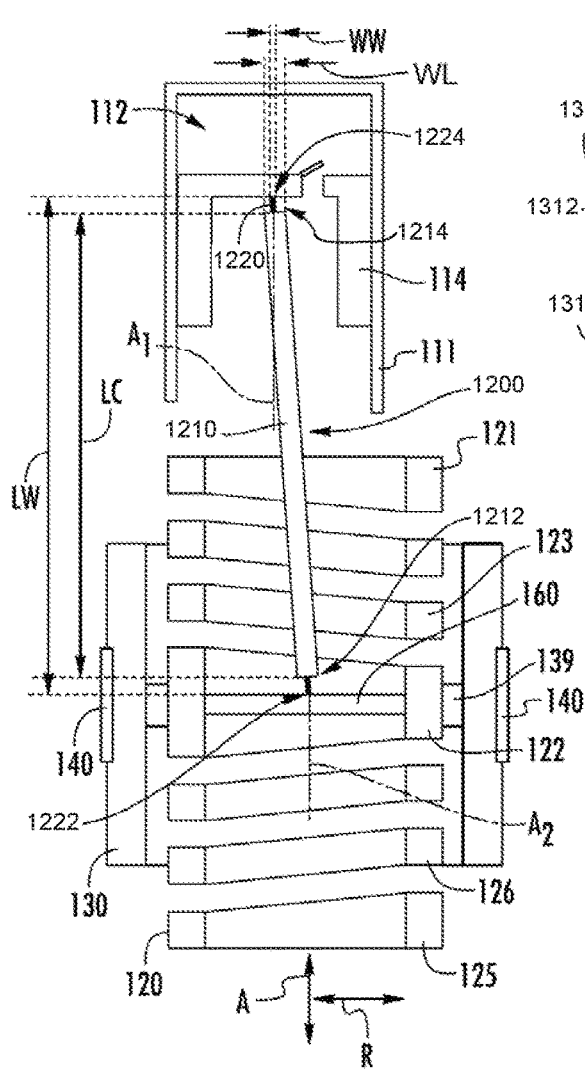
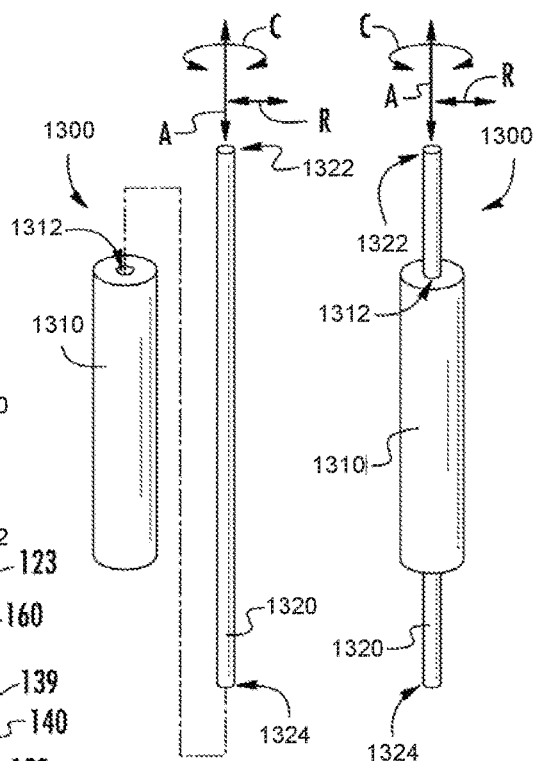
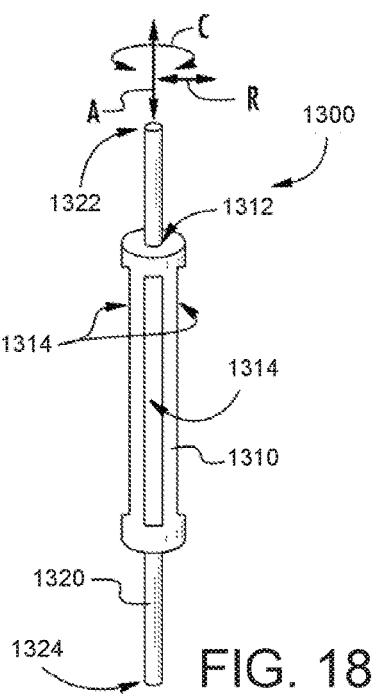
FIG. 15
FIG. 16   FIG. 17
FIG. 18

LINEAR COMPRESSOR AND A SPRING ASSEMBLY

FIELD OF THE INVENTION

The present subject matter relates generally to linear compressors, e.g., for refrigerator appliances, and spring assemblies.

BACKGROUND OF THE INVENTION

Certain refrigerator appliances include sealed systems for cooling chilled chambers of the refrigerator appliance. The sealed systems generally include a compressor that generates compressed refrigerant during operation of the sealed system. The compressed refrigerant flows to an evaporator where heat exchange between the chilled chambers and the refrigerant cools the chilled chambers and food items located therein.

Recently, certain refrigerator appliances have included linear compressors for compressing refrigerant. Linear compressors generally include a piston and a driving coil. The driving coil receives a current that generates a force for sliding the piston forward and backward within a chamber. During motion of the piston within the chamber, the piston compresses refrigerant. However, friction between the piston and a wall of the chamber can negatively affect operation of the linear compressors if the piston is not suitably aligned within the chamber. In particular, friction losses due to rubbing of the piston against the wall of the chamber can negatively affect an efficiency of an associated refrigerator appliance.

The driving coil generally engages a magnet on a mover assembly of the linear compressor in order to reciprocate the piston within the chamber. The magnet is spaced apart from the driving coil by an air gap. In certain linear compressors, an additional air gap is provided at an opposite side of the magnet, e.g., between the magnet and an inner back iron of the linear compressor. However, multiple air gaps can negatively affect operation of the linear compressor by interrupting transmission of a magnetic field from the driving coil. In addition, maintaining a uniform air gap between the magnet and the driving coil and/or inner back iron can be difficult.

Accordingly, a linear compressor with features for limiting friction between a piston and a wall of a cylinder during operation of the linear compressor would be useful. In addition, a linear compressor with features for maintaining uniformity of an air gap between a magnet and a driving coil of the linear compressor would be useful. In particular, a linear compressor having only a single air gap would be useful.

BRIEF DESCRIPTION OF THE INVENTION

The present subject matter provides a linear compressor. The linear compressor includes a spring assembly. An inner back iron assembly is fixed to the spring assembly at a middle portion of the spring assembly. A driving coil is operable to move the inner back iron assembly in order to reciprocate a piston within a chamber of a cylinder assembly. Additional aspects and advantages of the invention will be set forth in part in the following description, or may be apparent from the description, or may be learned through practice of the invention.

In a first exemplary embodiment, a linear compressor is provided. The linear compressor includes a casing that extends between a first end portion and a second end portion. The casing also has a cylinder assembly that is positioned at the second end portion of the casing. The cylinder assembly defines a chamber. A piston is slidably received within the chamber of the cylinder assembly. A driving coil mounted to the casing, and an inner back iron assembly is positioned in the driving coil. The inner back iron assembly has an outer surface. A magnet is mounted to the inner back iron assembly at the outer surface of the inner back iron assembly such that the magnet faces the driving coil. A spring assembly includes a first cylindrical portion, a second cylindrical portion, a third cylindrical portion, a first helical portion and a second helical portion. The first cylindrical portion is mounted to the casing at the first end portion of the casing. The second cylindrical portion is positioned within and fixed to the inner back iron assembly. The first helical portion is mounted to the first and second cylindrical portions such that the first helical portion extends between and couples the first and second cylindrical portions together. The third cylindrical portion is mounted to the casing at the second end portion of the casing. The second helical portion is mounted to the second and third cylindrical portions such that the second helical portion extends between and couples the second and third cylindrical portions together.

In a second exemplary embodiment, a linear compressor defines a radial direction, a circumferential direction and an axial direction. The linear compressor includes a casing that extends between a first end portion and a second end portion along the axial direction. The casing has a cylinder assembly positioned at the second end portion of the casing. The cylinder assembly defines a chamber, and a piston is received within the chamber of the cylinder assembly such that the piston is slidable along a first axis within the chamber of the cylinder assembly. A spring assembly extends between the first and second end portions of the casing. An inner back iron assembly extends about the spring assembly along the circumferential direction. The inner back iron assembly is fixed to the spring assembly at a middle portion of the spring assembly. A driving coil extends about the inner back iron assembly along the circumferential direction. The driving coil is operable to move the inner back iron assembly along a second axis during operation of the driving coil. The first and second axes are substantially parallel to the axial direction. A magnet is mounted to the inner back iron assembly such that the magnet is spaced apart from the driving coil by an air gap along the radial direction.

In a third exemplary embodiment, a spring assembly for a linear compressor is provided. The spring assembly includes a first cylindrical portion and a second cylindrical portion. A first helical portion is mounted to the first and second cylindrical portions such that the first helical portion extends between and couples the first and second cylindrical portions together. A third cylindrical portion is positioned opposite the first cylindrical portion about the second cylindrical portion. A second helical portion is mounted to the second and third cylindrical portions such that the second helical portion extends between and couples the second and third cylindrical portions together. The first, second and third cylindrical portions and the first and second helical portions of the spring assembly are discrete from one another.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 15 provides a schematic view of a compliant coupling according to another exemplary embodiment of the present subject matter with certain components of the exemplary linear compressor of FIG. 3.

FIGS. 16, 17 and 18 provide perspective views of a compliant coupling according to another exemplary embodiment of the present subject matter in various stages of assembly.

DETAILED DESCRIPTION

Figure 1:
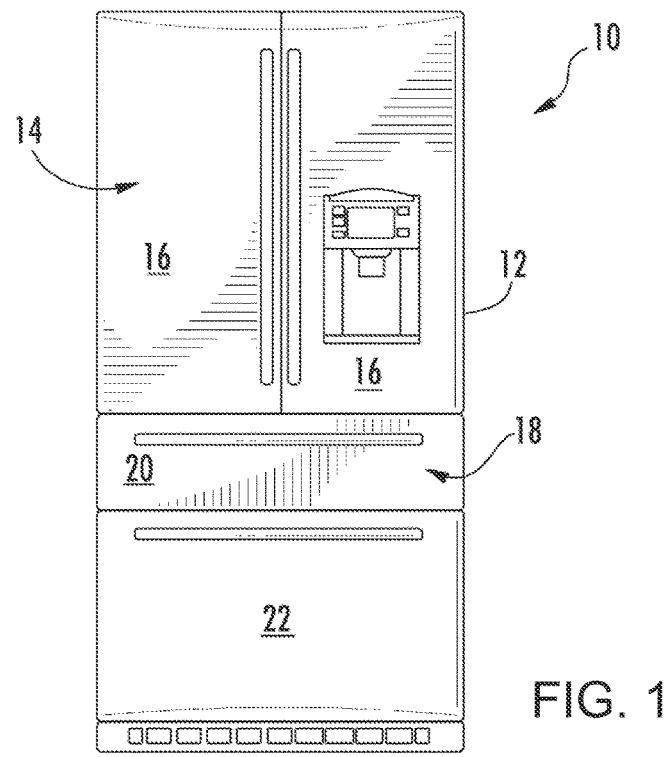
FIG. 1 is a front elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
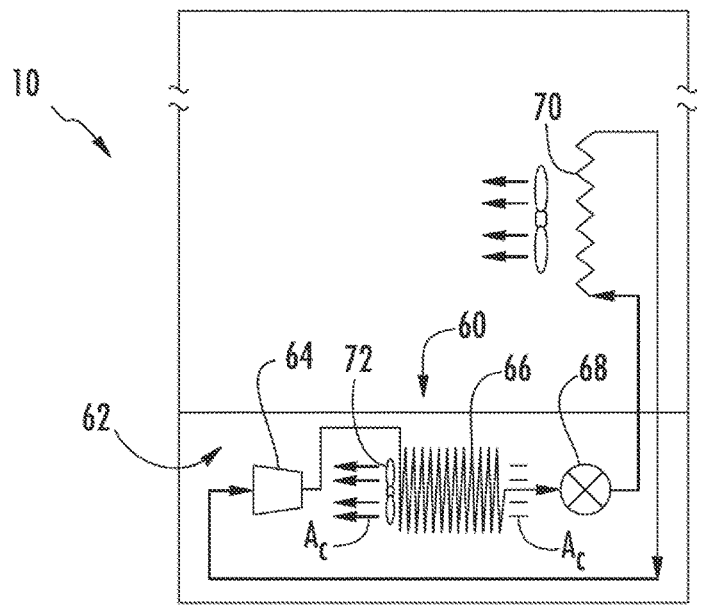
FIG. 2 is schematic view of certain components of the exemplary refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated exemplary embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
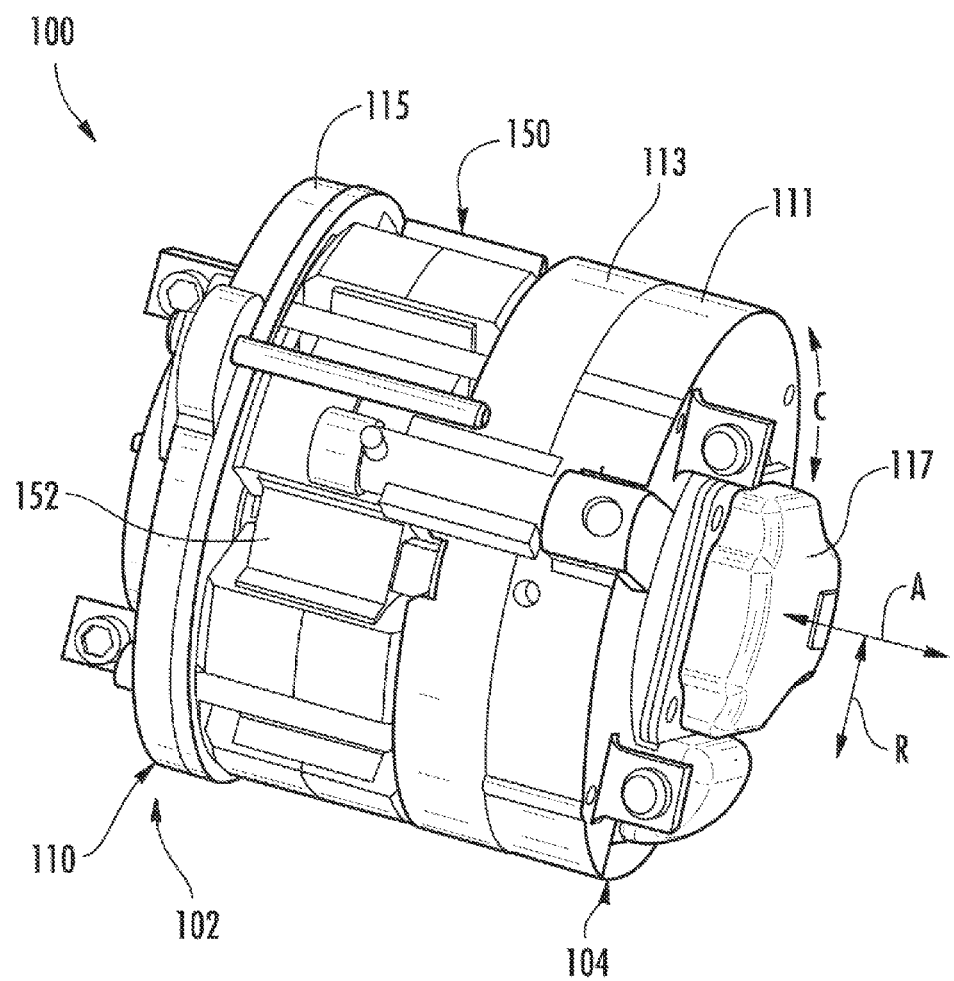
FIG. 3 provides a perspective view of a linear compressor according to an exemplary embodiment of the present subject matter.
Figure 4:
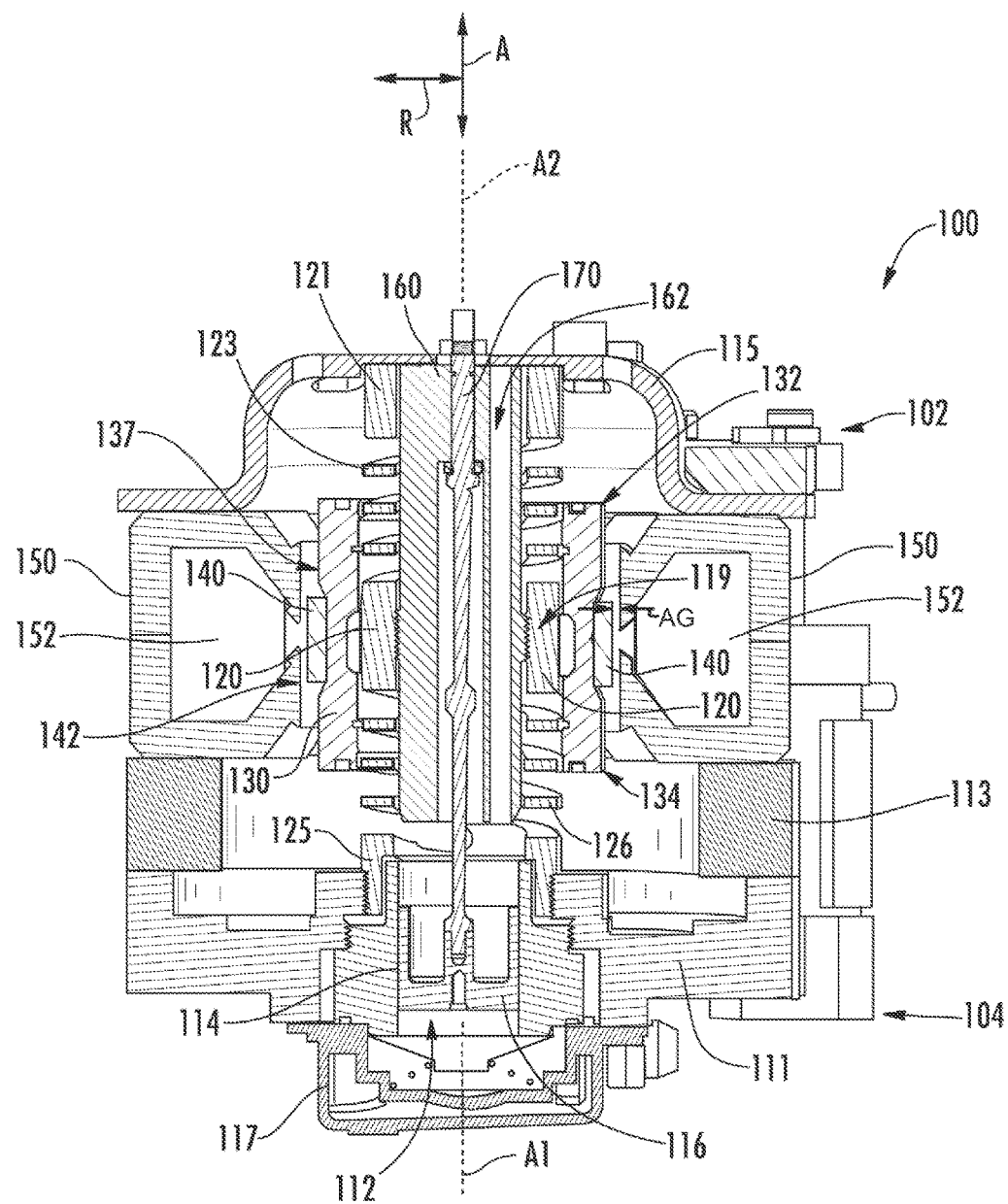
FIG. 4 provides a side section view of the exemplary linear compressor of FIG. 3.
Figure 5:
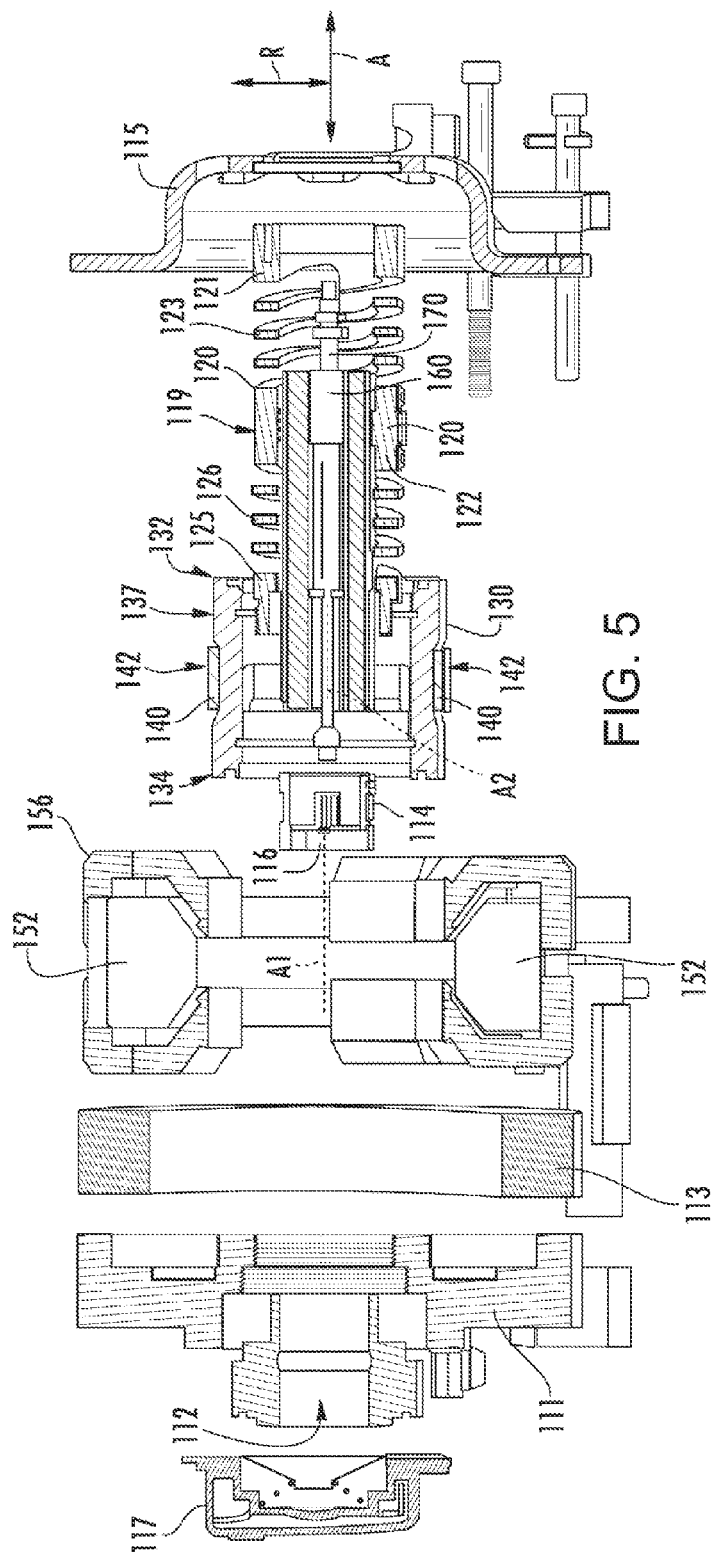
FIG. 5 provides an exploded view of the exemplary linear compressor of FIG. 4.

FIG. 3 provides a perspective view of a linear compressor 100 according to an exemplary embodiment of the present subject matter. FIG. 4 provides a side section view of linear compressor 100. FIG. 5 provides an exploded side section view of linear compressor 100. As discussed in greater detail below, linear compressor 100 is operable to increase a pressure of fluid within a chamber 112 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2). As may be seen in FIG. 3, linear compressor 100 defines an axial direction A, a radial direction R and a circumferential direction C. Linear compressor 100 may be enclosed within a hermetic or air-tight shell (not shown). The hermetic shell can, e.g., hinder or prevent refrigerant from leaking or escaping from refrigeration system 60.

Turning now to FIG. 4, linear compressor 100 includes a casing 110 that extends between a first end portion 102 and a second end portion 104, e.g., along the axial direction A. Casing 110 includes various static or non-moving structural components of linear compressor 100. In particular, casing 110 includes a cylinder assembly 111 that defines a chamber 112. Cylinder assembly 111 is positioned at or adjacent second end portion 104 of casing 110. Chamber 112 extends longitudinally along the axial direction A. Casing 110 also includes a motor mount mid-section 113 and an end cap 115 positioned opposite each other about a motor. A stator, e.g., including an outer back iron 150 and a driving coil 152, of the motor is mounted or secured to casing 110, e.g., such that the stator is sandwiched between motor mount mid-section 113 and end cap 115 of casing 110. Linear compressor 100 also includes valves (such as a discharge valve assembly 117 at an end of chamber 112) that permit refrigerant to enter and exit chamber 112 during operation of linear compressor 100.

A piston assembly 114 with a piston head 116 is slidably received within chamber 112 of cylinder assembly 111. In particular, piston assembly 114 is slidable along a first axis A1 within chamber 112. The first axis A1 may be substantially parallel to the axial direction A. During sliding of piston head 116 within chamber 112, piston head 116 compresses refrigerant within chamber 112. As an example, from a top dead center position, piston head 116 can slide within chamber 112 towards a bottom dead center position along the axial direction A, i.e., an expansion stroke of piston head 116. When piston head 116 reaches the bottom dead center position, piston head 116 changes directions and slides in chamber 112 back towards the top dead center position, i.e., a compression stroke of piston head 116. It should be understood that linear compressor 100 may include an additional piston head and/or additional chamber at an opposite end of linear compressor 100. Thus, linear compressor 100 may have multiple piston heads in alternative exemplary embodiments.

Linear compressor 100 also includes an inner back iron assembly 130. Inner back iron assembly 130 is positioned in the stator of the motor. In particular, outer back iron 150 and/or driving coil 152 may extend about inner back iron assembly 130, e.g., along the circumferential direction C. Inner back iron assembly 130 extends between a first end portion 132 and a second end portion 134, e.g., along the axial direction A.

Inner back iron assembly 130 also has an outer surface 137. At least one driving magnet 140 is mounted to inner back iron assembly 130, e.g., at outer surface 137 of inner back iron assembly 130. Driving magnet 140 may face and/or be exposed to driving coil 152. In particular, driving magnet 140 may be spaced apart from driving coil 152, e.g., along the radial direction R by an air gap AG. Thus, the air gap AG may be defined between opposing surfaces of driving magnet 140 and driving coil 152. Driving magnet 140 may also be mounted or fixed to inner back iron assembly 130 such that an outer surface 142 of driving magnet 140 is substantially flush with outer surface 137 of inner back iron assembly 130. Thus, driving magnet 140 may be inset within inner back iron assembly 130. In such a manner, the magnetic field from driving coil 152 may have to pass through only a single air gap (e.g., air gap AG) between outer back iron 150 and inner back iron assembly 130 during operation of linear compressor 100, and linear compressor 100 may be more efficient than linear compressors with air gaps on both sides of a driving magnet.

As may be seen in FIG. 4, driving coil 152 extends about inner back iron assembly 130, e.g., along the circumferential direction C. Driving coil 152 is operable to move the inner back iron assembly 130 along a second axis A2 during operation of driving coil 152. The second axis may be substantially parallel to the axial direction A and/or the first axis A1. As an example, driving coil 152 may receive a current from a current source (not shown) in order to generate a magnetic field that engages driving magnet 140 and urges piston assembly 114 to move along the axial direction A in order to compress refrigerant within chamber 112 as described above and will be understood by those skilled in the art. In particular, the magnetic field of driving coil 152 may engage driving magnet 140 in order to move inner back iron assembly 130 along the second axis A2 and piston head 116 along the first axis A1 during operation of driving coil 152. Thus, driving coil 152 may slide piston assembly 114 between the top dead center position and the bottom dead center position, e.g., by moving inner back iron assembly 130 along the second axis A2, during operation of driving coil 152.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 152 of the motor. Thus, the controller may selectively activate driving coil 152, e.g., by supplying current to driving coil 152, in order to compress refrigerant with piston assembly 114 as described above.

The controller includes memory and one or more processing devices such as microprocessors, CPUs or the like, such as general or special purpose microprocessors operable to execute programming instructions or micro-control code associated with operation of linear compressor 100. The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Linear compressor 100 also includes a machined spring 120. Machined spring 120 is positioned in inner back iron assembly 130. In particular, inner back iron assembly 130 may extend about machined spring 120, e.g., along the circumferential direction C. Machined spring 120 also extends between first and second end portions 102 and 104 of casing 110, e.g., along the axial direction A. Machined spring 120 assists with coupling inner back iron assembly 130 to casing 110, e.g., cylinder assembly 111 of casing 110. In particular, inner back iron assembly 130 is fixed to machined spring 120 at a middle portion 119 of machined spring 120 as discussed in greater detail below.

During operation of driving coil 152, machined spring 120 supports inner back iron assembly 130. In particular, inner back iron assembly 130 is suspended by machined spring 120 within the stator or the motor of linear compressor 100 such that motion of inner back iron assembly 130 along the radial direction R is hindered or limited while motion along the second axis A2 is relatively unimpeded. Thus, machined spring 120 may be substantially stiffer along the radial direction R than along the axial direction A. In such a manner, machined spring 120 can assist with maintaining a uniformity of the air gap AG between driving magnet 140 and driving coil 152, e.g., along the radial direction R, during operation of the motor and movement of inner back iron assembly 130 on the second axis A2. Machined spring 120 can also assist with hindering side pull forces of the motor from transmitting to piston assembly 114 and being reacted in cylinder assembly 111 as a friction loss.

Figure 6:
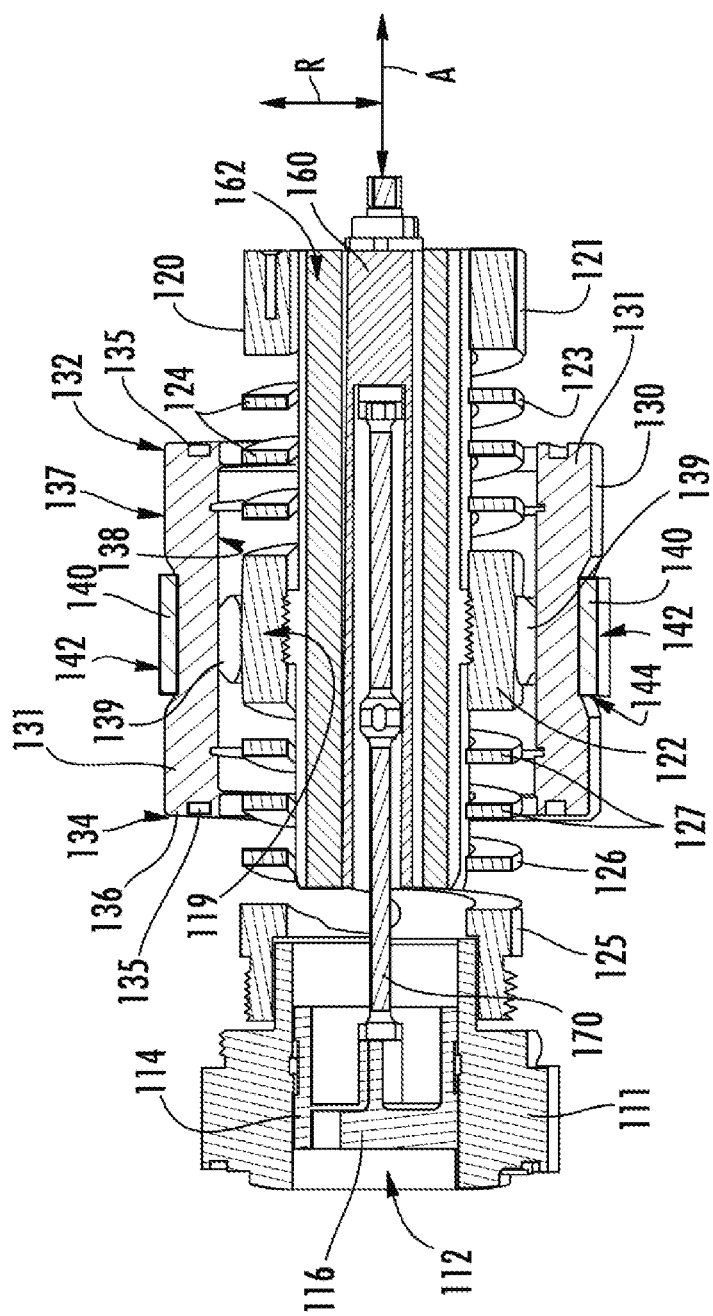
FIG. 6 provides a side section view of certain components of the exemplary linear compressor of FIG. 3.
Figure 7:
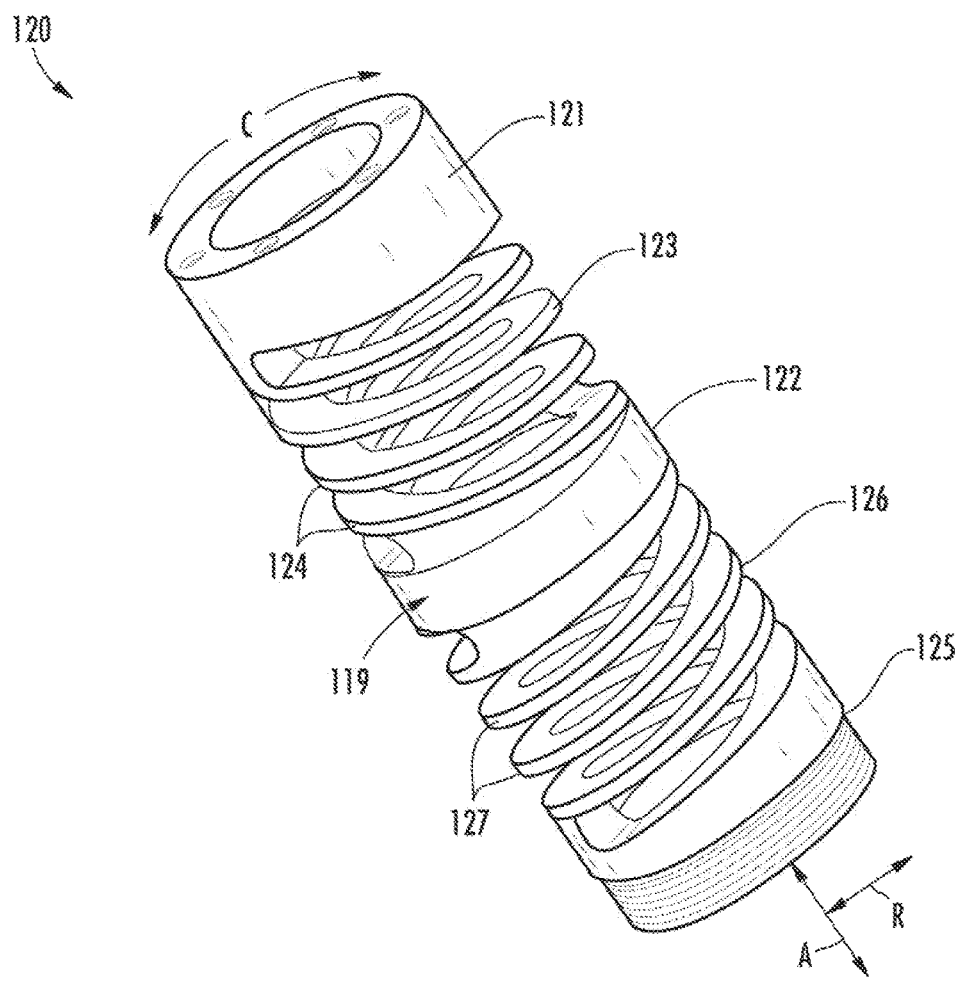
FIG. 7 provides a perspective view of a machined spring of the exemplary linear compressor of FIG. 3.

FIG. 6 provides a side section view of certain components of linear compressor 100. FIG. 7 provides a perspective view of machined spring 120. As may be seen in FIG. 7, machined spring 120 includes a first cylindrical portion 121, a second cylindrical portion 122, a first helical portion 123, a third cylindrical portion 125 and a second helical portion 126. First helical portion 123 of machined spring 120 extends between and couples first and second cylindrical portions 121 and 122 of machined spring 120, e.g., along the axial direction A. Similarly, second helical portion 126 of machined spring 120 extends between and couples second and third cylindrical portions 122 and 125 of machined spring 120, e.g., along the axial direction A.

Turning back to FIG. 4, first cylindrical portion 121 is mounted or fixed to casing 110 at first end portion 102 of casing 110. Thus, first cylindrical portion 121 is positioned at or adjacent first end portion 102 of casing 110. Third cylindrical portion 125 is mounted or fixed to casing 110 at second end portion 104 of casing 110, e.g., to cylinder assembly 111 of casing 110. Thus, third cylindrical portion 125 is positioned at or adjacent second end portion 104 of casing 110. Second cylindrical portion 122 is positioned at middle portion 119 of machined spring 120. In particular, second cylindrical portion 122 is positioned within and fixed to inner back iron assembly 130. Second cylindrical portion 122 may also be positioned equidistant from first and third cylindrical portions 121 and 125, e.g., along the axial direction A.

First cylindrical portion 121 of machined spring 120 is mounted to casing 110 with fasteners (not shown) that extend though end cap 115 of casing 110 into first cylindrical portion 121. In alternative exemplary embodiments, first cylindrical portion 121 of machined spring 120 may be threaded, welded, glued, fastened, or connected via any other suitable mechanism or method to casing 110. Third cylindrical portion 125 of machined spring 120 is mounted to cylinder assembly 111 at second end portion 104 of casing 110 via a screw thread of third cylindrical portion 125 threaded into cylinder assembly 111. In alternative exemplary embodiments, third cylindrical portion 125 of machined spring 120 may be welded, glued, fastened, or connected via any other suitable mechanism or method, such as an interference fit, to casing 110.

As may be seen in FIG. 7, first helical portion 123 extends, e.g., along the axial direction A, between first and second cylindrical portions 121 and 122 and couples first and second cylindrical portions 121 and 122 together. Similarly, second helical portion 126 extends, e.g., along the axial direction A, between second and third cylindrical portions 122 and 125 and couples second and third cylindrical portions 122 and 125 together. Thus, second cylindrical portion 122 is suspended between first and third cylindrical portions 121 and 125 with first and second helical portions 123 and 126.

First and second helical portions 123 and 126 and first, second and third cylindrical portions 121, 122 and 125 of machined spring 120 may be continuous with one another and/or integrally mounted to one another. As an example, machined spring 120 may be formed from a single, continuous piece of metal, such as steel, or other elastic material. In addition, first, second and third cylindrical portions 121, 122 and 125 and first and second helical portions 123 and 126 of machined spring 120 may be positioned coaxially relative to one another, e.g., on the second axis A2.

First helical portion 123 includes a first pair of helices 124. Thus, first helical portion 123 may be a double start helical spring. Helical coils of first helices 124 are separate from each other. Each helical coil of first helices 124 also extends between first and second cylindrical portions 121 and 122 of machined spring 120. Thus, first helices 124 couple first and second cylindrical portions 121 and 122 of machined spring 120 together. In particular, first helical portion 123 may be formed into a double-helix structure in which each helical coil of first helices 124 is wound in the same direction and connect first and second cylindrical portions 121 and 122 of machined spring 120.

Second helical portion 126 includes a second pair of helices 127. Thus, second helical portion 126 may be a double start helical spring. Helical coils of second helices 127 are separate from each other. Each helical coil of second helices 127 also extends between second and third cylindrical portions 122 and 125 of machined spring 120. Thus, second helices 127 couple second and third cylindrical portions 122 and 125 of machined spring 120 together. In particular, second helical portion 126 may be formed into a double-helix structure in which each helical coil of second helices 127 is wound in the same direction and connect second and third cylindrical portions 122 and 125 of machined spring 120.

By providing first and second helices 124 and 127 rather than a single helix, a force applied by machined spring 120 may be more even and/or inner back iron assembly 130 may rotate less during motion of inner back iron assembly 130 along the second axis A2. In addition, first and second helices 124 and 127 may be counter or oppositely wound. Such opposite winding may assist with further balancing the force applied by machined spring 120 and/or inner back iron assembly 130 may rotate less during motion of inner back iron assembly 130 along the second axis A2. In alternative exemplary embodiments, first and second helices 124 and 127 may include more than two helices. For example, first and second helices 124 and 127 may each include three helices, four helices, five helices or more.

By providing machined spring 120 rather than a coiled wire spring, performance of linear compressor 100 can be improved. For example, machined spring 120 may be more reliable than comparable coiled wire springs. In addition, the stiffness of machined spring 120 along the radial direction R may be greater than that of comparable coiled wire springs. Further, comparable coiled wire springs include an inherent unbalanced moment. Machined spring 120 may be formed to eliminate or substantially reduce any inherent unbalanced moments. As another example, adjacent coils of a comparable coiled wire spring contact each other at an end of the coiled wire spring, and such contact may dampen motion of the coiled wire spring thereby negatively affecting a performance of an associated linear compressor. In contrast, by being formed of a single continuous material and having no contact between adjacent coils, machined spring 120 may have less dampening than comparable coiled wire springs.

As may be seen in FIG. 6, inner back iron assembly 130 includes an outer cylinder 136 and a sleeve 139. Outer cylinder 136 defines outer surface 137 of inner back iron assembly 130 and also has an inner surface 138 positioned opposite outer surface 137 of outer cylinder 136. Sleeve 139 is positioned on or at inner surface 138 of outer cylinder 136. A first interference fit between outer cylinder 136 and sleeve 139 may couple or secure outer cylinder 136 and sleeve 139 together. In alternative exemplary embodiments, sleeve 139 may be welded, glued, fastened, or connected via any other suitable mechanism or method to outer cylinder 136.

Sleeve 139 extends about machined spring 120, e.g., along the circumferential direction C. In addition, middle portion 119 of machined spring 120 (e.g., third cylindrical portion 125) is mounted or fixed to inner back iron assembly 130 with sleeve 139. As may be seen in FIG. 6, sleeve 139 extends between inner surface 138 of outer cylinder 136 and middle portion 119 of machined spring 120, e.g., along the radial direction R. In particular, sleeve 139 extends between inner surface 138 of outer cylinder 136 and second cylindrical portion 122 of machined spring 120, e.g., along the radial direction R. A second interference fit between sleeve 139 and middle portion 119 of machined spring 120 may couple or secure sleeve 139 and middle portion 119 of machined spring 120 together. In alternative exemplary embodiments, sleeve 139 may be welded, glued, fastened, or connected via any other suitable mechanism or method to middle portion 119 of machined spring 120 (e.g., second cylindrical portion 122 of machined spring 120).

Outer cylinder 136 may be constructed of or with any suitable material. For example, outer cylinder 136 may be constructed of or with a plurality of (e.g., ferromagnetic) laminations 131. Laminations 131 are distributed along the circumferential direction C in order to form outer cylinder 136. Laminations 131 are mounted to one another or secured together, e.g., with rings 135 at first and second end portions 132 and 134 of inner back iron assembly 130. Outer cylinder 136, e.g., laminations 131, define a recess 144 that extends inwardly from outer surface 137 of outer cylinder 136, e.g., along the radial direction R. Driving magnet 140 is positioned in recess 144, e.g., such that driving magnet 140 is inset within outer cylinder 136.

A piston flex mount 160 is mounted to and extends through inner back iron assembly 130. In particular, piston flex mount 160 is mounted to inner back iron assembly 130 via sleeve 139 and machined spring 120. Thus, piston flex mount 160 may be coupled (e.g., threaded) to machined spring 120 at second cylindrical portion 122 of machined spring 120 in order to mount or fix piston flex mount 160 to inner back iron assembly 130. A coupling 170 extends between piston flex mount 160 and piston assembly 114, e.g., along the axial direction A. Thus, coupling 170 connects inner back iron assembly 130 and piston assembly 114 such that motion of inner back iron assembly 130, e.g., along the axial direction A or the second axis A2, is transferred to piston assembly 114.

Figure 10:
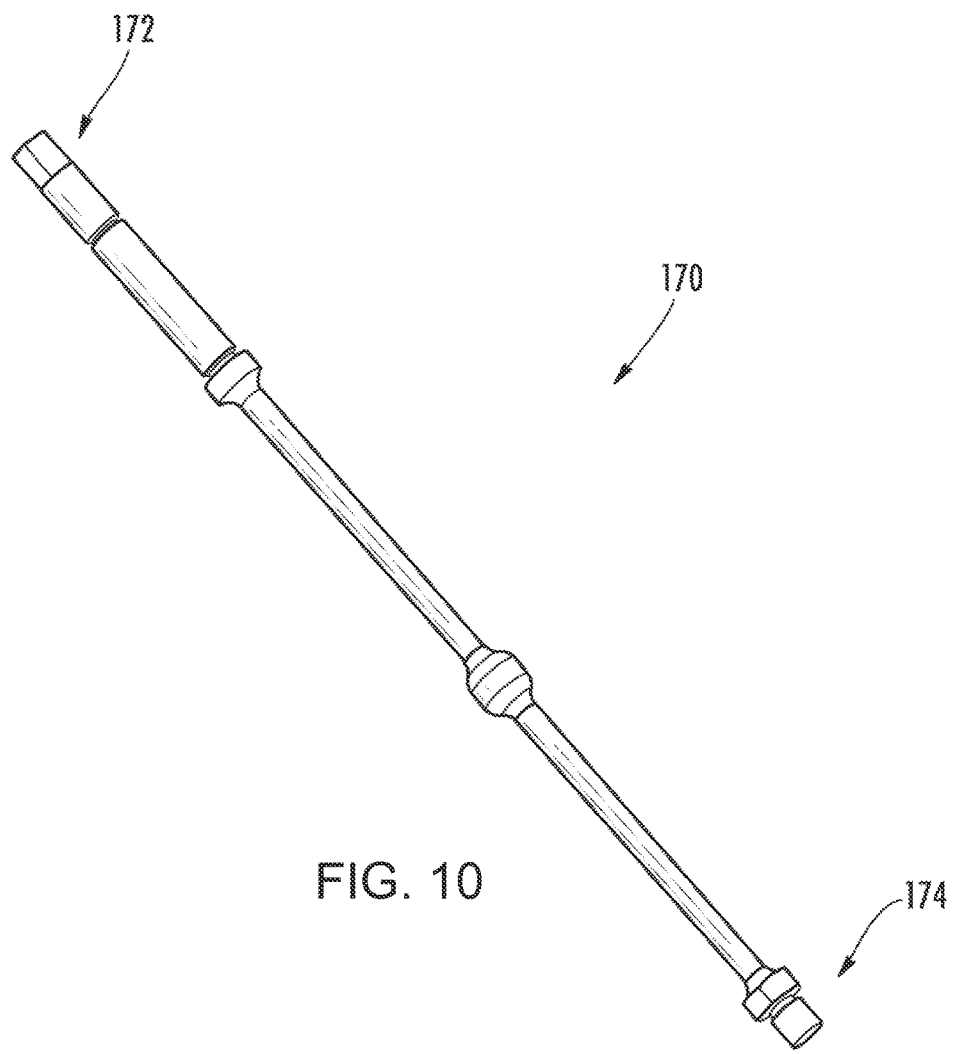
FIG. 10 provides a perspective view of a coupling according to an exemplary embodiment of the present subject matter.

FIG. 10 provides a perspective view of coupling 170. As may be seen in FIG. 10, coupling 170 extends between a first end portion 172 and a second end portion 174, e.g., along the axial direction A. Turning back to FIG. 6, first end portion 172 of coupling 170 is mounted to the piston flex mount 160, and second end portion 174 of coupling 170 is mounted to piston assembly 114. First and second end portions 172 and 174 of coupling 170 may be positioned at opposite sides of driving coil 152. In particular, coupling 170 may extend through driving coil 152, e.g., along the axial direction A.

Figure 8:
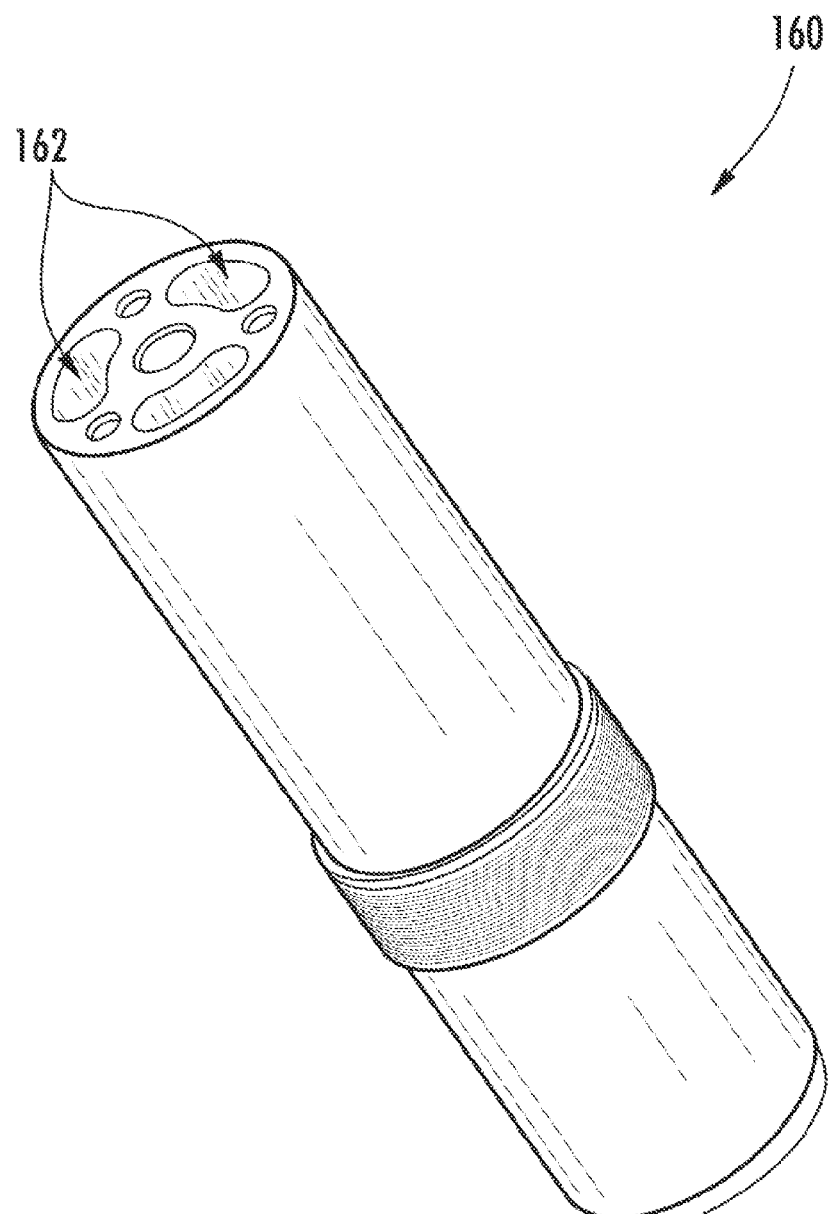
FIG. 8 provides a perspective view of a piston flex mount of the exemplary linear compressor of FIG. 3.
Figure 9:
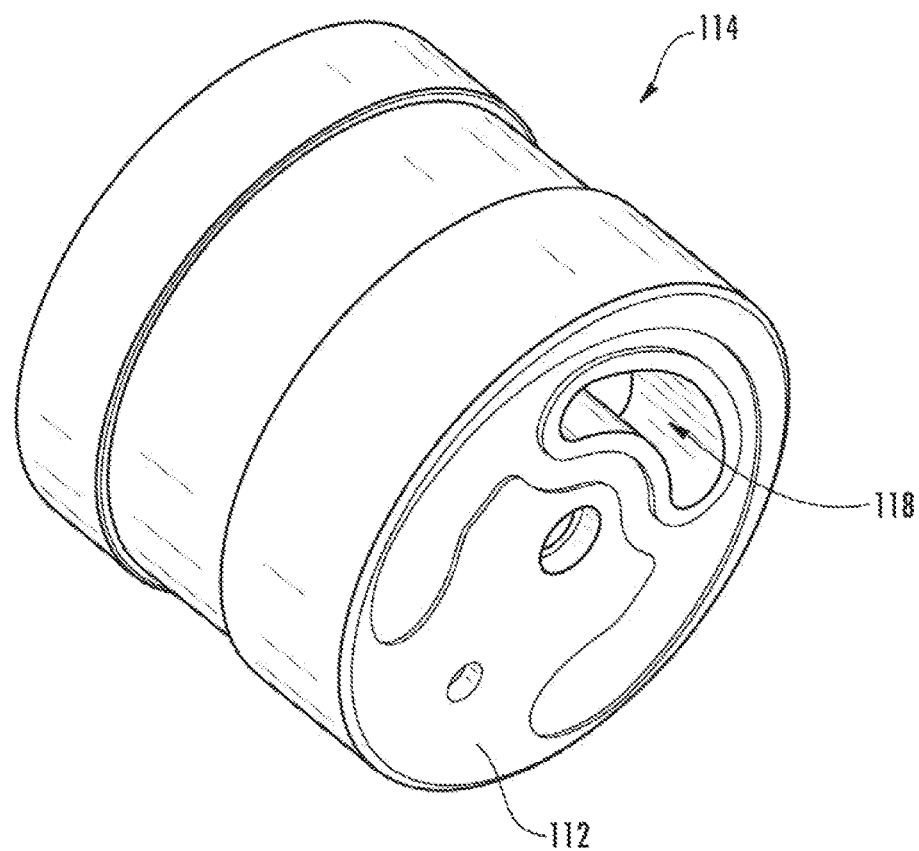
FIG. 9 provides a perspective view of a piston of the exemplary linear compressor of FIG. 3.

FIG. 8 provides a perspective view of piston flex mount 160. FIG. 9 provides a perspective view of piston assembly 114. As may be seen in FIG. 8, piston flex mount 160 defines at least one passage 162. Passage 162 of piston flex mount 160 extends, e.g., along the axial direction A, through piston flex mount 160. Thus, a flow of fluid, such as air or refrigerant, may pass though piston flex mount 160 via passage 162 of piston flex mount 160 during operation of linear compressor 100.

As may be seen in FIG. 9, piston head 116 also defines at least one opening 118. Opening 110 of piston head 116 extends, e.g., along the axial direction A, through piston head 116. Thus, the flow of fluid may pass though piston head 116 via opening 118 of piston head 116 into chamber 112 during operation of linear compressor 100. In such a manner, the flow of fluid (that is compressed by piston head 114 within chamber 112) may flow through piston flex mount 160 and inner back iron assembly 130 to piston assembly 114 during operation of linear compressor 100.

Figure 11:
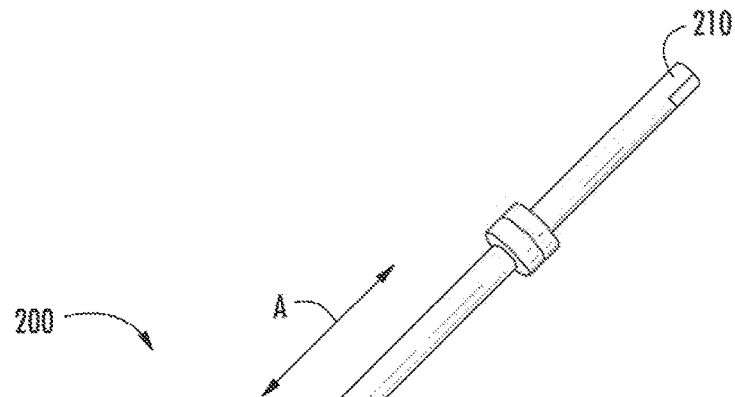
FIG. 11 provides a perspective view of a compliant coupling according to an exemplary embodiment of the present subject matter.

FIG. 11 provides a perspective view of a flexible or compliant coupling 200 according to an exemplary embodiment of the present subject matter. Compliant coupling 200 may be used in any suitable linear compressor to connect or couple a moving component of the linear compressor to a piston of the linear compressor. As an example, compliant coupling 200 may be used in linear compressor 100 (FIG. 3), e.g., as coupling 170. Thus, while described in the context of linear compressor 100, it should be understood that compliant coupling 200 may be used in any suitable linear compressor. In particular, compliant coupling 200 may be used in linear compressors with moving inner back irons or in linear compressors with stationary or fixed inner back irons.

As may be seen in FIG. 11, compliant coupling 200 includes a first connector or segment 210 and a second connector or segment 220. First and second segments 210 and 220 are spaced apart from each other, e.g., along the axial direction A. First segment 210 may be mounted to a mover of a linear compressor (e.g., a component moved by a motor during operation of the linear compressor). For example, first segment 210 may be mounted of fixed to inner back iron assembly 130 of linear compressor 100. In particular, first segment 210 may be threaded to inner back iron assembly 130 in certain exemplary embodiments. Second segment 220 may be mounted (e.g., threaded) to a piston 240. As an example, second segment 220 may be mounted to piston assembly 114 of linear compressor 100. A ball and socket joint 230 is disposed between and rotatably connects or couples first and second segments 210 and 220 together.

As discussed above, compliant coupling 200 may extend between inner back iron assembly 130 and piston assembly 114, e.g., along the axial direction A, and connect inner back iron assembly 130 and piston assembly 114 together. In particular, compliant coupling 200 transfers motion of inner back iron assembly 130 along the axial direction A to piston assembly 114. However, compliant coupling 200 is compliant or flexible along the radial direction R due to ball and socket joint 230. In particular, ball and socket joint 230 of compliant coupling 200 may be sufficiently compliant along the radial direction R such little or no motion of inner back iron assembly 130 along the radial direction R is transferred to piston assembly 114 by compliant coupling 200. In such a manner, side pull forces of the motor are decoupled from piston assembly 114 and/or cylinder assembly 111 and friction between position assembly 114 and cylinder assembly 111 may be reduced.

Figure 12:
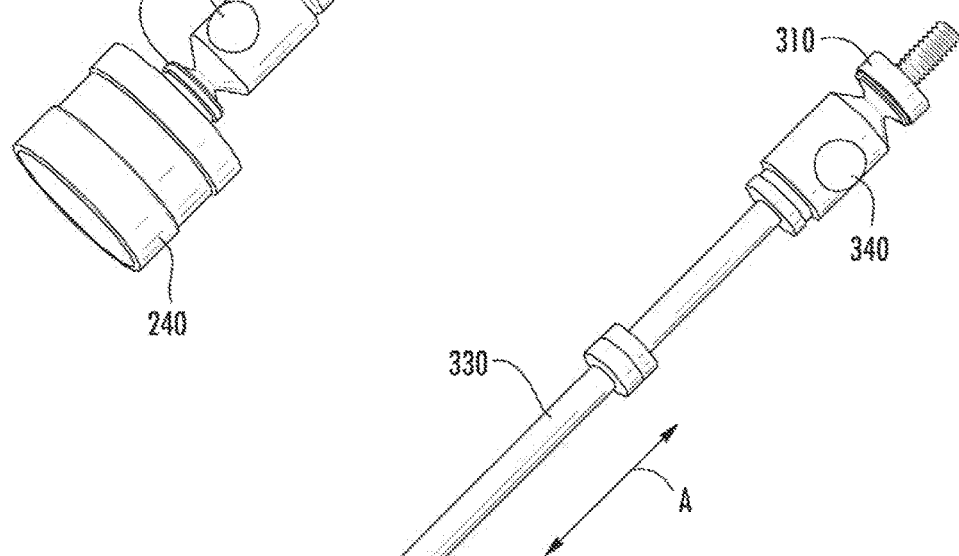
FIG. 12 provides a perspective view of a compliant coupling according to another exemplary embodiment of the present subject matter.

FIG. 12 provides a perspective view of a flexible or compliant coupling 300 according to another exemplary embodiment of the present subject matter. Compliant coupling 300 may be used in any suitable linear compressor to connect or couple a moving component of the linear compressor to a piston of the linear compressor. As an example, compliant coupling 300 may be used in linear compressor 100 (FIG. 3), e.g., as coupling 170. Thus, while described in the context of linear compressor 100, it should be understood that compliant coupling 300 may be used in any suitable linear compressor. In particular, compliant coupling 300 may be used in linear compressors with moving inner back irons or in linear compressors with stationary or fixed inner back irons.

As may be seen in FIG. 12, compliant coupling 300 includes a first connector or segment 310, a second connector or segment 320 and a third connector or segment 330. First, second and third segments 310, 320 and 330 are spaced apart from each other, e.g., along the axial direction A. First segment 310 may be mounted to a mover of a linear compressor (e.g., a component moved by a motor during operation of the linear compressor). For example, first segment 310 may be mounted of fixed to inner back iron assembly 130 of linear compressor 100. In particular, first segment 310 may be threaded to piston flex mount 160 within inner back iron assembly 130 in certain exemplary embodiments. Second segment 320 may be mounted (e.g., threaded) to a piston 350. As an example, second segment 320 may be mounted to piston assembly 114 of linear compressor 100. Third segment 330 is positioned or disposed between first and second segments 310 and 320, e.g., along the axial direction A.

A pair of ball and socket joints 340 rotatably connects first, second and third segments 310, 320 and 330 together. In particular, a first one of ball and socket joints 340 rotatably connects or couples first segment 310 to third segment 330, and a second one of ball and socket joints 340 rotatably connects or couples second segment 320 to third segment 330. Thus, ball and socket joints 340 rotatably connects first segment 310 to third segment 330 and second segment 320 to third segment 330, respectively.

As discussed above, compliant coupling 300 may extend between inner back iron assembly 130 and piston assembly 114, e.g., along the axial direction A, and connect inner back iron assembly 130 and piston assembly 114 together. In particular, compliant coupling 300 transfers motion of inner back iron assembly 130 along the axial direction A to piston assembly 114. However, compliant coupling 300 is compliant or flexible along the radial direction R due to ball and socket joints 340. In particular, ball and socket joints 340 of compliant coupling 300 may be sufficiently compliant along the radial direction R such little or no motion of inner back iron assembly 130 along the radial direction R is transferred to piston assembly 114 by compliant coupling 300. In such a manner, side pull forces of the motor are decoupled from piston assembly 114 and/or cylinder assembly 111 and friction between position assembly 114 and cylinder assembly 111 may be reduced.

Figure 13:
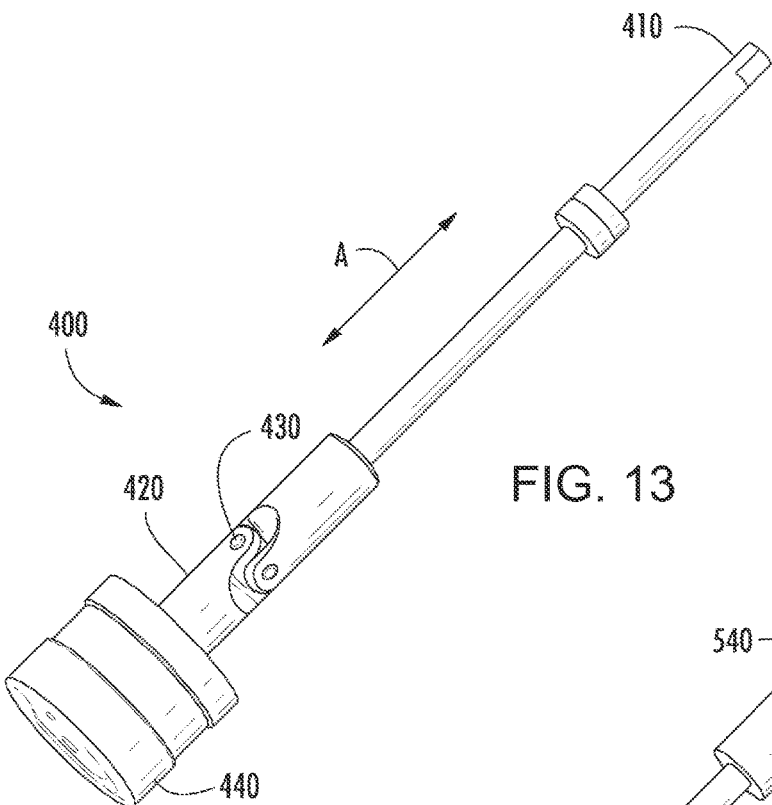
FIG. 13 provides a perspective view of a compliant coupling according to another exemplary embodiment of the present subject matter.

FIG. 13 provides a perspective view of a flexible or compliant coupling 400 according to another exemplary embodiment of the present subject matter. Compliant coupling 400 may be used in any suitable linear compressor to connect or couple a moving component of the linear compressor to a piston of the linear compressor. As an example, compliant coupling 400 may be used in linear compressor 100 (FIG. 3), e.g., as coupling 170. Thus, while described in the context of linear compressor 100, it should be understood that compliant coupling 400 may be used in any suitable linear compressor. In particular, compliant coupling 400 may be used in linear compressors with moving inner back irons or in linear compressors with stationary or fixed inner back irons.

As may be seen in FIG. 13, compliant coupling 400 includes a first connector or segment 410 and a second connector or segment 420. First and second segments 410 and 420 are spaced apart from each other, e.g., along the axial direction A. First segment 410 may be mounted to a mover of a linear compressor (e.g., a component moved by a motor during operation of the linear compressor). For example, first segment 410 may be mounted of fixed to inner back iron assembly 130 of linear compressor 100. In particular, first segment 410 may be threaded to piston flex mount 160 within inner back iron assembly 130 in certain exemplary embodiments. Second segment 420 may be mounted (e.g., threaded) to a piston 440. As an example, second segment 420 may be mounted to piston assembly 114 of linear compressor 100. A universal joint 430 is disposed between and rotatably connects or couples first and second segments 410 and 420 together.

As discussed above, compliant coupling 400 may extend between inner back iron assembly 130 and piston assembly 114, e.g., along the axial direction A, and connect inner back iron assembly 130 and piston assembly 114 together. In particular, compliant coupling 400 transfers motion of inner back iron assembly 130 along the axial direction A to piston assembly 114. However, compliant coupling 400 is compliant or flexible along the radial direction R due to universal joint 430. In particular, universal joint 430 of compliant coupling 400 may be sufficiently compliant along the radial direction R such little or no motion of inner back iron assembly 130 along the radial direction R is transferred to piston assembly 114 by compliant coupling 400. In such a manner, side pull forces of the motor are decoupled from piston assembly 114 and/or cylinder assembly 111 and friction between position assembly 114 and cylinder assembly 111 may be reduced.

Figure 14:
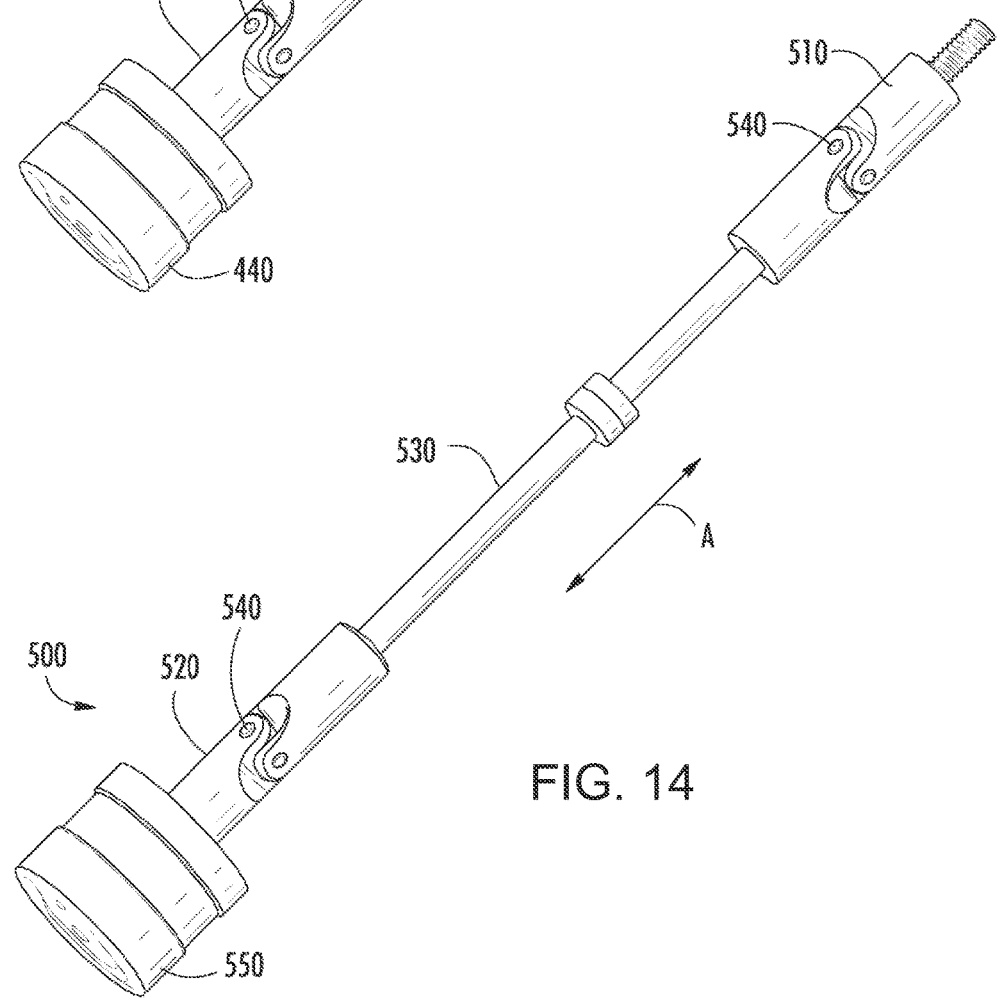
FIG. 14 provides a perspective view of a compliant coupling according to another exemplary embodiment of the present subject matter.

FIG. 14 provides a perspective view of a flexible or compliant coupling 500 according to another exemplary embodiment of the present subject matter. Compliant coupling 500 may be used in any suitable linear compressor to connect or couple a moving component of the linear compressor to a piston of the linear compressor. As an example, compliant coupling 500 may be used in linear compressor 100 (FIG. 3), e.g., as coupling 170. Thus, while described in the context of linear compressor 100, it should be understood that compliant coupling 500 may be used in any suitable linear compressor. In particular, compliant coupling 500 may be used in linear compressors with moving inner back irons or in linear compressors with stationary or fixed inner back irons.

As may be seen in FIG. 14, compliant coupling 500 includes a first connector or segment 510, a second connector or segment 520 and a third connector or segment 530. First, second and third segments 510, 520 and 530 are spaced apart from each other, e.g., along the axial direction A. First segment 510 may be mounted to a mover of a linear compressor (e.g., a component moved by a motor during operation of the linear compressor). For example, first segment 510 may be mounted of fixed to inner back iron assembly 130 of linear compressor 100. In particular, first segment 510 may be threaded to piston flex mount 160 within inner back iron assembly 130 in certain exemplary embodiments. Second segment 520 may be mounted (e.g., threaded) to a piston 550. As an example, second segment 520 may be mounted to piston assembly 114 of linear compressor 100. Third segment 530 is positioned or disposed between first and second segments 510 and 520, e.g., along the axial direction A.

A pair of universal joints 540 rotatably connects first, second and third segments 510, 520 and 530 together. In particular, a first one of universal joints 540 rotatably connects or couples first segment 510 to third segment 530, and a second one of universal joints 540 rotatably connects or couples second segment 520 to third segment 530. Thus, universal joints 540 rotatably connects first segment 510 to third segment 530 and second segment 520 to third segment 530, respectively.

As discussed above, compliant coupling 500 may extend between inner back iron assembly 130 and piston assembly 114, e.g., along the axial direction A, and connect inner back iron assembly 130 and piston assembly 114 together. In particular, compliant coupling 500 transfers motion of inner back iron assembly 130 along the axial direction A to piston assembly 114. However, compliant coupling 500 is compliant or flexible along the radial direction R due to universal joints 540. In particular, universal joints 540 of compliant coupling 500 may be sufficiently compliant along the radial direction R such little or no motion of inner back iron assembly 130 along the radial direction R is transferred to piston assembly 114 by compliant coupling 500. In such a manner, side pull forces of the motor are decoupled from piston assembly 114 and/or cylinder assembly 111 and friction between position assembly 114 and cylinder assembly 111 may be reduced.

It should be understood that various combinations of ball and socket joints and universal joints may be used to rotatably connect segments of a compliant coupling in alternative exemplary embodiments. For example, the compliant coupling may include a universal joint and a ball and socket joint. The universal joint and the ball and socket joint may rotatably connect various segments of the compliant coupling together, e.g., in order to transfers motion of inner back iron assembly 130 along the axial direction A to piston assembly 114 while being compliant or flexible along the radial direction R. Thus, ball and socket joints and/or universal joints may be used to couple a piston of a linear compressor to a mover of the linear compressor such that motion of the mover is transferred to the piston during operation of the linear compressor, and the ball and socket joints and/or universal joints may also reduce friction between the piston and a cylinder of the linear compressor during motion of the piston within a chamber of the cylinder.

FIG. 15 provides a schematic view of a flexible or compliant coupling 1200 according to another exemplary embodiment of the present subject matter with certain components of linear compressor 100. Compliant coupling 1200 may be used in any suitable linear compressor to connect or couple a moving component (e.g., driven by a motor of the linear compressor) to a piston of the linear compressor. As an example, compliant coupling 1200 may be used in linear compressor 100 (FIG. 3), e.g., as coupling 170. Thus, while described in the context of linear compressor 100, it should be understood that compliant coupling 1200 may be used in any suitable linear compressor. In particular, compliant coupling 1200 may be used in linear compressors with moving inner back irons or in linear compressors with stationary or fixed inner back irons.

As may be seen in FIG. 15, compliant coupling 1200 includes a wire 1220. Wire 1220 may extend, e.g., along the axial direction A, between a mover of a linear compressor and a piston of the linear compressor. As an example, wire 1220 may extend between inner back iron assembly 130 and piston assembly 114, e.g., along the axial direction A. In particular, wire 1220 extends between a first end portion 1222 and a second end portion 1224, e.g., along the axial direction A. First end portion 1222 of wire 1220 is mounted or fixed to inner back iron assembly 130, e.g., via piston flex mount 160. Second end portion 1224 of wire 1220 is mounted or fixed to piston assembly 114.

Flexible coupling 1200 also includes a tubular element or column 1210. Column 1210 is mounted to wire 1220. In particular, column 1210 is positioned on wire 1220 between a mover of a linear compressor and a piston of the linear compressor. For example, column 1210 may be positioned on wire 1220 between inner back iron assembly 130 and piston assembly 114. As may be seen in FIG. 15, column 1210 extends between a first end portion 1212 and a second end portion 1214, e.g., along the axial direction A. First end portion 1212 of column 1210 is positioned at or adjacent first end portion 1222 of wire 1220. Second end portion 1214 of column 1210 is positioned at or adjacent second end portion 1224 of wire 1220. At least a portion of wire 1220 is disposed within column 1210. In particular, as shown in FIG. 15, wire 1220 may be positioned or enclosed concentrically within column 1210, e.g., in a plane that is perpendicular to the axial direction A.

Column 1210 has a width WC, e.g., in a plane that is perpendicular to the axial direction A. Wire 1220 also has a width WW, e.g., in a plane that is perpendicular to the axial direction A. The width WC of column 1210 and the width WW of wire 1220 may be any suitable widths. For example, the width WC of column 1210 may be greater than the width WW of wire 1220. In particular, the width WC of column 1210 may be at least two times, at least three times, at least five times, or at least ten times greater than the width WW of wire 1220.

Column 1210 also has a length LC, e.g., along the axial direction A, and wire 1220 has a length LW, e.g., along the axial direction A. The length LC of column 1210 and the length LW of wire 1220 may be any suitable lengths. For example, the length LC of column 1210 may be less than length LW of wire 1220. As another example, the length LW of wire 1220 may be less than about two centimeters greater than the length LC of column 1210. Thus, less than about two centimeters of wire 1220 between column 1210 and first end portion 1222 of wire 1220 may be exposed (e.g., not enclosed within column 1210), and less than about two centimeters of wire 1220 between column 1210 and second end portion 1224 of wire 1220 may be exposed (e.g., not enclosed within column 1210).

FIGS. 16, 17 and 18 provide perspective views of a flexible or compliant coupling 1300 according to another exemplary embodiment of the present subject matter. Compliant coupling 1300 is shown in various stages of assembly in FIGS. 16, 17 and 18. Compliant coupling 1200 (FIG. 15) may be constructed in the same or a similar manner as compliant coupling 1300. Thus, the method to assemble compliant coupling 1300 described below may be used to assemble compliant coupling 1200 within a linear compressor. However, it should be understood that compliant coupling 1300 may be used in any suitable linear compressor. In particular, compliant coupling 1300 may be used in linear compressors with moving inner back irons or in linear compressors with stationary or fixed inner back irons.

As may be seen in FIG. 16, compliant coupling 1300 includes a column 1310 and a wire 1320. Column 1310 defines a passage 1312 that extends through column 1310, e.g., along the axial direction A. To assemble compliant coupling 1300, wire 1320 may be extended between a mover of a linear compressor and a piston of the linear compressor. For example, wire 1320 may be extended between piston assembly 114 and inner back iron assembly 130, e.g., along the axial direction A, and wire 1320 may be secured or mounted to such elements. With wire 1320 suitably arranged, column 1310 may be positioned on wire 1320. For example, column 1310 may be positioned on wire 1320 by sliding wire 1320 into passage 1312 of column 1310 as shown in FIG. 17.

With column 1310 positioned on wire 1320, a position of column 1310 between first and second end portions 1322 and 1324 of wire 1320 may be adjusted. Thus, column 1310 may be moved on wire 1320 in order to suitably position column 1310 on wire 1320. As an example, column 1310 may be positioned on wire 1320 such that column 1310 is about equidistant from first and second end portions 1322 and 1324 of wire 1320.

With column 1310 suitably positioned on wire 1320, column 1310 may be mounted or fixed to wire 1320. For example, column 1310 may be crimped towards wire 1320, e.g., such passage 1312 of column 1310 deforms. In particular, as shown in FIG. 18, crimps 1314 may be formed on column 1310, e.g., by pressing column 1310 inwardly or towards wire 1320 along the radial direction R. Crimps 1314 may be compressed against wire 1320 to mount or fix column 1310 to wire 1320. In alternative exemplary embodiments, column 1310 may be mounted to wire 1320 prior to mounting wire 1320 to other components of linear compressor 100, e.g., prior to extending wire 1320 between piston assembly 114 and inner back iron assembly 130.

FIGS. 19, 20, 21 and 22 provide perspective views of a flexible or compliant coupling 1400 according to another exemplary embodiment of the present subject matter. Compliant coupling 1400 is shown in various stages of assembly in FIGS. 19, 20, 21 and 22. Compliant coupling 1200 (FIG. 15) may be constructed in the same or a similar manner as compliant coupling 1400. Thus, the method to assemble compliant coupling 1400 described below may be used to assemble compliant coupling 1200 within a linear compressor. However, it should be understood that compliant coupling 1400 may be used in any suitable linear compressor. In particular, compliant coupling 1400 may be used in linear compressors with moving inner back irons or in linear compressors with stationary or fixed inner back irons.

Figure 19:
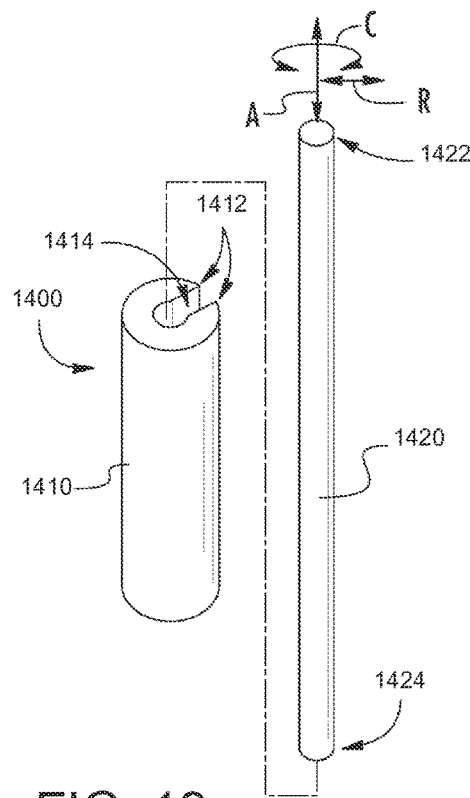
FIGS. 19, 20, 21 and 22 provide perspective views of a compliant coupling according to another exemplary embodiment of the present subject matter in various stages of assembly.

As may be seen in FIG. 19, compliant coupling 1400 includes a column 1410 and a wire 1420. Column 1410 includes a pair of opposing edges 1412 that are spaced apart from each other, e.g., along the circumferential direction C. In particular, opposing edges 1412 may be spaced apart from each other such that opposing edges 1412 define a slot 1414 therebetween, e.g., along the circumferential direction C.

Figure 20:
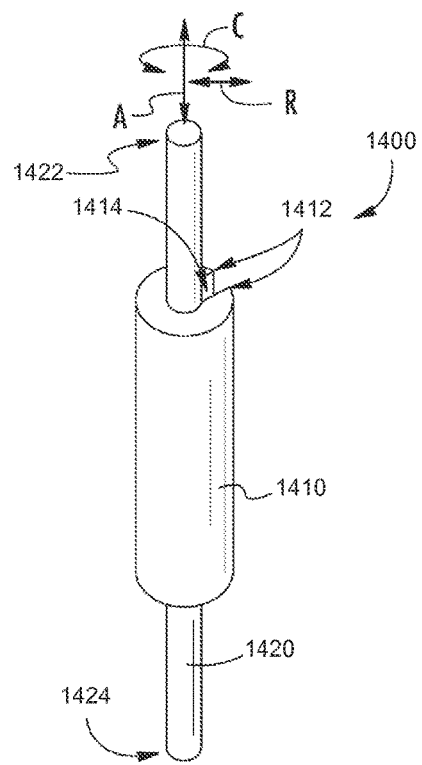

To assemble compliant coupling 1400, wire 1420 may be extended between a mover of a linear compressor and a piston of the linear compressor. For example, wire 1420 may be extended between piston assembly 114 and inner back iron assembly 130, e.g., along the axial direction A, and wire 1420 may be secured or mounted to such elements. With wire 1420 suitably arranged, column 1410 may be positioned on wire 1420. For example, column 1410 may be positioned on wire 1420 by sliding wire 1420 into slot 1414 between opposing edges 1412 of column 1410 as shown in FIG. 20.

Figure 21:
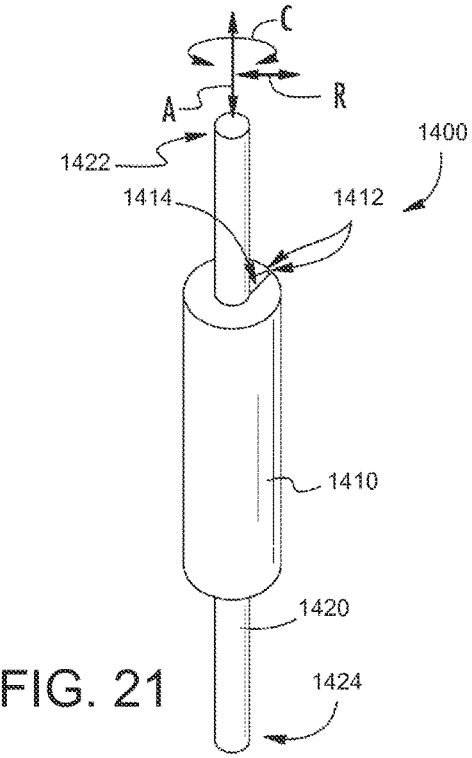

With column 1410 positioned on wire 1420, opposing edges 1412 of column 1410 may be partially crimped together as shown in FIG. 21, e.g., to hinder or prevent column 1410 from falling off wire 1420. With column 1410 so disposed, a position of column 1410 between first and second end portions 1422 and 1424 of wire 1420 may be adjusted. Thus, column 1410 may be moved on wire 1420 in order to suitably position column 1410 on wire 1420. As an example, column 1410 may be positioned on wire 1420 such that column 1410 is about equidistant from first and second end portions 1422 and 1424 of wire 1420.

Figure 22:
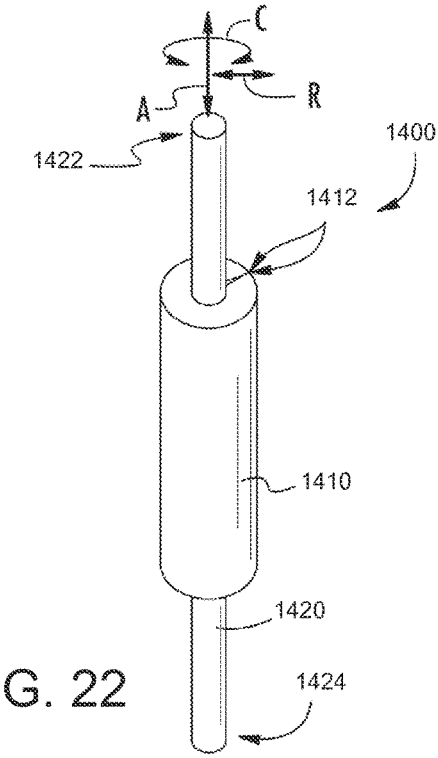

With column 1410 suitably positioned on wire 1420, column 1410 may be mounted or fixed to wire 1420. For example, wire 1420 may be enclosed within column 1410 by crimping opposing edges 1412 of column 1410 towards each other, e.g., along the circumferential direction C until opposing edges 1412 of column 1410 contact each other as shown in FIG. 22. Thus, column 1410 may be compressed onto wire 1420 along a length of column 1410 in order to mount or fix column 1410 to wire 1420. In alternative exemplary embodiments, column 1410 may be mounted to wire 1420 prior to mounting wire 1420 to other components of linear compressor 100, e.g., prior to extending wire 1420 between piston assembly 114 and inner back iron assembly 130.

Turning back to FIG. 15, first and second axes A1 and A2 may be offset from each other, e.g., along the radial direction R. Thus, first and second axes A1 and A2 may not be coaxial, and motion of inner back iron assembly 130 may be offset from piston assembly 114, e.g., along the radial direction R. In addition, first and second end portions 1222 and 1224 of wire 1220 may be offset from each other, e.g., along the radial direction R. The offset between first and second axes A1 and A2, e.g., along the radial direction R, may be any suitable offset. For example, first and second axes A1 and A2 may be offset from each other, e.g., along the radial direction R, by less than about one hundredth of an inch.

As discussed above, compliant coupling 1200 may extend between inner back iron assembly 130 and piston assembly 114, e.g., along the axial direction A, and connect inner back iron assembly 130 and piston assembly 114 together. In particular, compliant coupling 1200 transfers motion of inner back iron assembly 130 along the axial direction A to piston assembly 114. However, compliant coupling 1200 is compliant or flexible along the radial direction R due to column 1210 and wire 1220. In particular, exposed portions of wire 1220 (e.g., portions of wire 1220 not enclosed within column 1210) may be sufficiently compliant along the radial direction R such little or no motion of inner back iron assembly 130 along the radial direction R is transferred to piston assembly 114 by compliant coupling 1200. Thus, column 1210 may assist with transferring compressive loads between inner back iron assembly 130 and piston assembly 114 along the axial direction A while wire 1220 may assist with transferring tensile loads between inner back iron assembly 130 and piston assembly 114 along the axial direction A despite first and second axes A1 and A2 being offset from each other, e.g., along the radial direction R. In such a manner, side pull forces of the motor are decoupled from piston assembly 114 and/or cylinder assembly 111 and friction between position assembly 114 and cylinder assembly 111 may be reduced.

Figure 23:
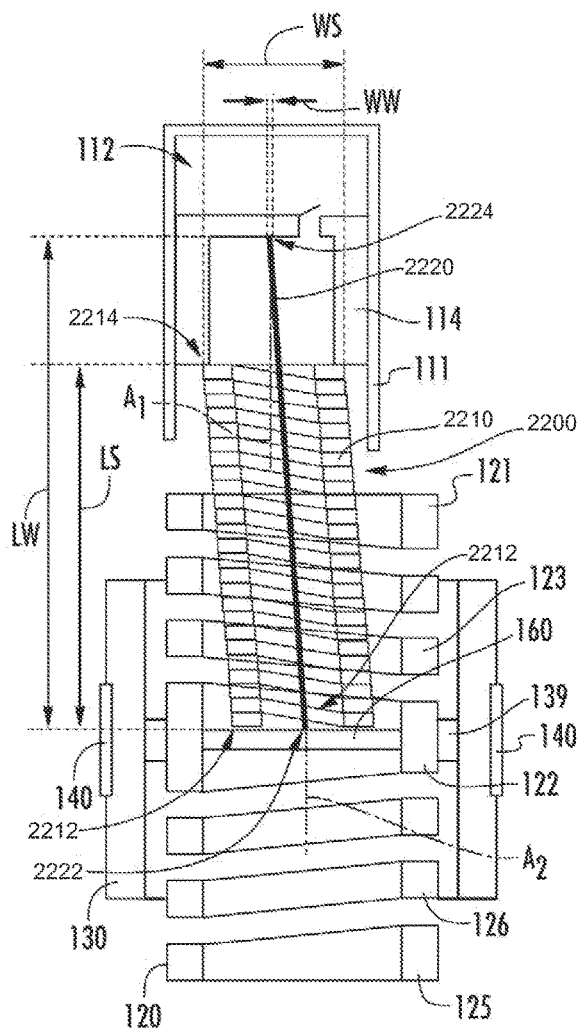
FIG. 23 provides a schematic view of a compliant coupling according to another exemplary embodiment of the present subject matter.

FIG. 23 provides a schematic view of a flexible or compliant coupling 2200 according to another exemplary embodiment of the present subject matter with certain components of linear compressor 100. Compliant coupling 2200 may be used in any suitable linear compressor to connect or couple a moving component (e.g., driven by a motor of the linear compressor) to a piston of the linear compressor. As an example, compliant coupling 2200 may be used in linear compressor 100 (FIG. 3), e.g., as coupling 170. Thus, while described in the context of linear compressor 100, it should be understood that compliant coupling 2200 may be used in any suitable linear compressor. In particular, compliant coupling 2200 may be used in linear compressors with moving inner back irons or in linear compressors with stationary or fixed inner back irons.

As may be seen in FIG. 23, flexible coupling 2200 includes a flat wire coil spring 2210. Flat wire coil spring 2210 may extend, e.g., along the axial direction A, between a mover of a linear compressor and a piston of the linear compressor. For example, flat wire coil spring 2210 may extend between inner back iron assembly 130 and piston assembly 114, e.g., along the axial direction A. In particular, flat wire coil spring 2210 extends between a first end portion 2212 and a second end portion 2214, e.g., along the axial direction A. First end portion 2212 of flat wire coil spring 2210 is mounted or fixed to inner back iron assembly 130, e.g., via piston flex mount 160. Second end portion 2214 of flat wire coil spring 2210 is mounted or fixed to piston assembly 114.

Compliant coupling 2200 also includes a wire 2220. Wire 2220 is disposed within flat wire coil spring 2210. Wire 2220 may extend, e.g., along the axial direction A, between a mover of a linear compressor and a piston of the linear compressor within flat wire coil spring 2210. As an example, wire 2220 may extend between inner back iron assembly 130 and piston assembly 114, e.g., along the axial direction A, within flat wire coil spring 2210. In particular, wire 2220 extends between a first end portion 2222 and a second end portion 2224, e.g., along the axial direction A. First end portion 2222 of wire 2220 is mounted or fixed to inner back iron assembly 130, e.g., via piston flex mount 160. Second end portion 2224 of wire 2220 is mounted or fixed to piston assembly 114. As shown in FIG. 23, wire 2220 may be positioned concentrically within flat wire coil spring 2210, e.g., in a plane that is perpendicular to the axial direction A.

Flat wire coil spring 2210 has a width WS, e.g., in a plane that is perpendicular to the axial direction A. Wire 2220 also has a width WW, e.g., in a plane that is perpendicular to the axial direction A. The width WS of flat wire coil spring 2210 and the width WW of wire 2220 may be any suitable widths. For example, the width WS of flat wire coil spring 2210 may be greater than the width WW of wire 2220. In particular, the width WS of flat wire coil spring 2210 may be at least five times, at least ten times, or at least twenty times greater than the width WW of wire 2220.

Flat wire coil spring 2210 also has a length LS, e.g., along the axial direction A, and wire 2220 has a length LW, e.g., along the axial direction A. The length LS of flat wire coil spring 2210 and the length LW of wire 2220 may be any suitable lengths. For example, the length LS of flat wire coil spring 2210 may be about equal to the length LW of wire 2220. As another example, the length LS of flat wire coil spring 2210 may be greater than length LW of wire 2220.

Figure 24:
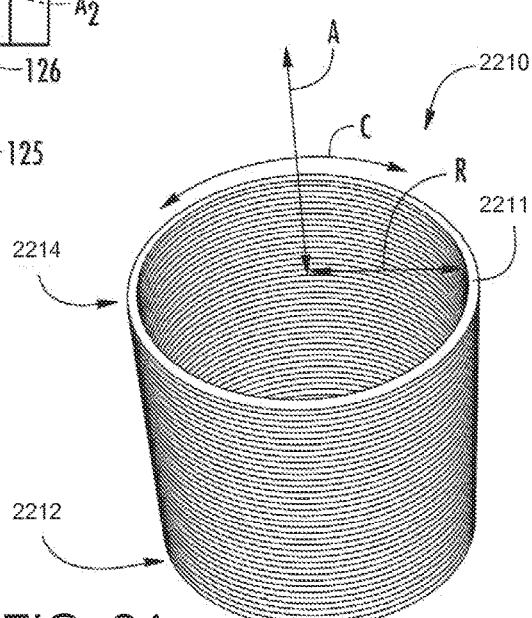
FIGS. 24 and 25 provide perspective views of a flat wire coil spring of the exemplary compliant coupling of FIG. 23.
Figure 25:
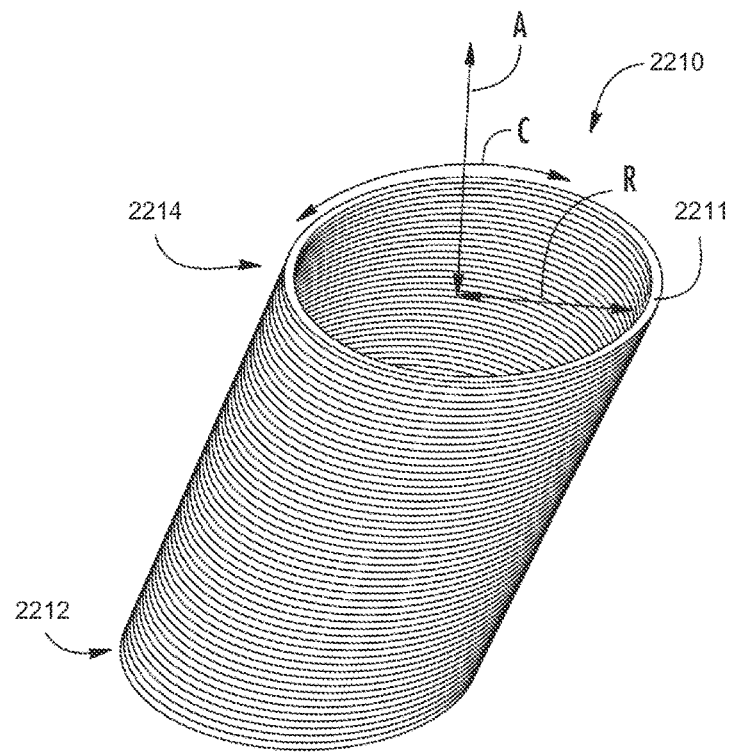

FIGS. 24 and 25 provide perspective views of flat wire coil spring 2210 of compliant coupling 2200. As may be seen in FIGS. 24 and 25, flat wire coil spring 2210 includes a flat wire 2211. Flat wire 2211 may be constructed of or with any suitable material. For example, flat wire 2211 may be constructed of or with a metal, such as steel.

Figure 26:
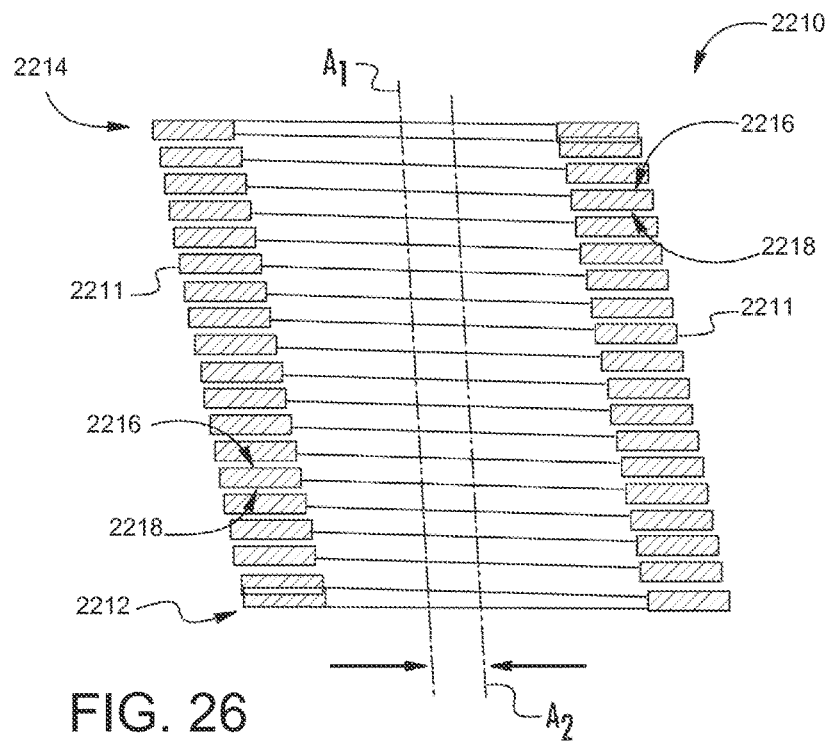
FIG. 26 provides a section view of the flat wire coil spring of FIG. 25.

Flat wire 2211 is wound or coiled into a helical shape to form flat wire coil spring 2210. In particular, flat wire 2211 has a first flat or planar surface 2216 (FIG. 26) and a second flat or planar surface 2218 (FIG. 26). First and second planar surfaces 2216 and 2218 are positioned opposite each other on flat wire 2211, e.g., along the axial direction A. With flat wire 2211 wound or coiled into a helical shape, first planar surface 2216 of flat wire 2211 is positioned on and contacts second planar surface 2218 of flat wire 2211 between adjacent coils of flat wire coil spring 2210. Thus, first planar surface 2216 of flat wire 2211 in a first coil of flat wire coil spring 2210 is positioned on and contacts second planar surface 2218 of flat wire 2211 in a second coil of flat wire coil spring 2210. The first and second coils of flat wire coil spring 2210 being positioned adjacent each other. Thus, in certain exemplary embodiments, flat wire coil spring 2210 may be naturally fully compressed as shown in FIG. 24.

FIG. 26 provides a section view of flat wire coil spring 2210. As may be seen in FIG. 26, first and second axes A1 and A2 may be offset from each other, e.g., along the radial direction R. Thus, first and second axes A1 and A2 may not be coaxial, and motion of inner back iron assembly 130 may be offset from piston assembly 114, e.g., along the radial direction R. In addition, first and second end portions 2212 and 2214 of flat wire coil spring 2210 may be offset from each other, e.g., along the radial direction R, and first and second end portions 2222 and 2224 of wire 2220 may be offset from each other, e.g., along the radial direction R. The offset between first and second axes A1 and A2, e.g., along the radial direction R, may be any suitable offset. For example, first and second axes A1 and A2 may be offset from each other, e.g., along the radial direction R, by less than about one hundredth of an inch.

Flat wire coil spring 2210 can support large compressive loads, e.g., in the natural state shown in FIG. 24 and/or in the radially deflected configuration of FIG. 25. Thus, flat wire coil spring 2210 can support large compressive loads despite first and second end portions 2212 and 2214 of flat wire coil spring 2210 being offset from each other, e.g., along the radial direction R. In addition, flat wire coil spring 2210 can permit first and second end portions 2212 and 2214 of flat wire coil spring 2210 to translate, e.g., along the radial direction R, with respect to each other with little force required.

As discussed above, compliant coupling 2200 may extend between inner back iron assembly 130 and piston assembly 114, e.g., along the axial direction A, and connect inner back iron assembly 130 and piston assembly 114 together. In particular, compliant coupling 2200 transfers motion of inner back iron assembly 130 along the axial direction A to piston assembly 114. However, compliant coupling 2200 is compliant or flexible along the radial direction R due to flat wire coil spring 2210 and wire 2220. In particular, flat wire coil spring 2210 and wire 2220 of compliant coupling 2200 may be sufficiently compliant along the radial direction R such little or no motion of inner back iron assembly 130 along the radial direction R is transferred to piston assembly 114 by compliant coupling 2200. For example, flat wire coil spring 2210 may assist with transferring compressive loads between inner back iron assembly 130 and piston assembly 114 along the axial direction A while wire 2220 may assist with transferring tensile loads between inner back iron assembly 130 and piston assembly 114 along the axial direction A despite first and second axes A1 and A2 being offset from each other, e.g., along the radial direction R. In such a manner, side pull forces of the motor are decoupled from piston assembly 114 and/or cylinder assembly 111 and friction between position assembly 114 and cylinder assembly 111 may be reduced.

Figure 27:
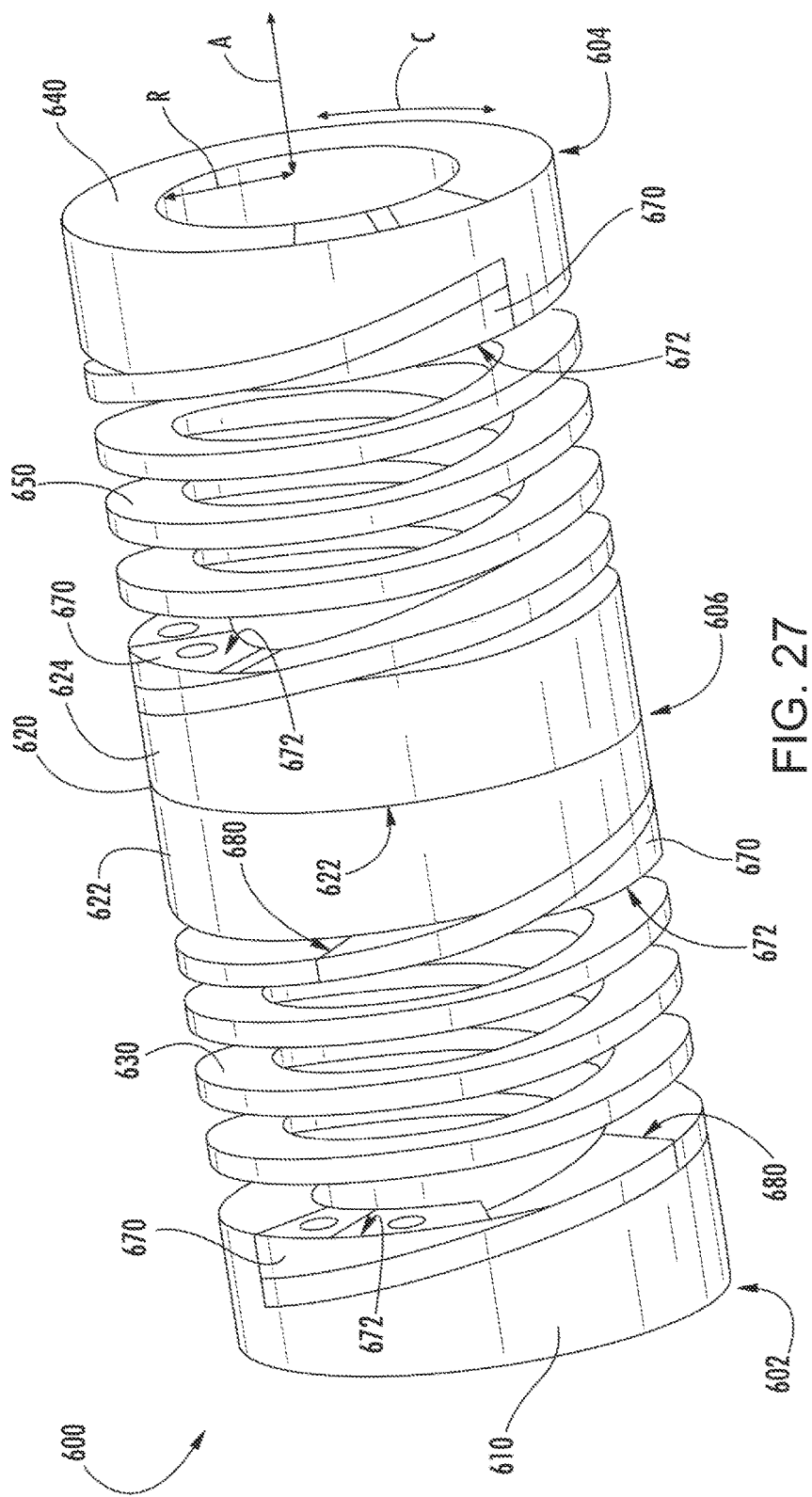
FIG. 27 provides a perspective view of a spring assembly according to an exemplary embodiment of the present subject matter.
Figure 28:
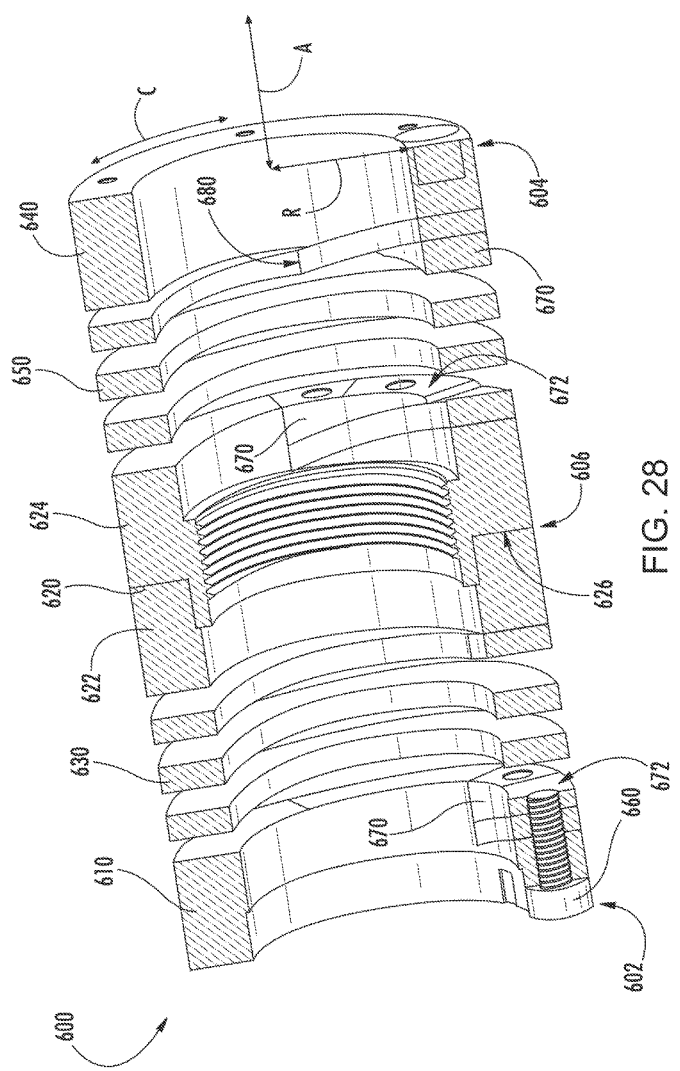
FIG. 28 provides a section view of the exemplary spring assembly of FIG. 27.
Figure 29:
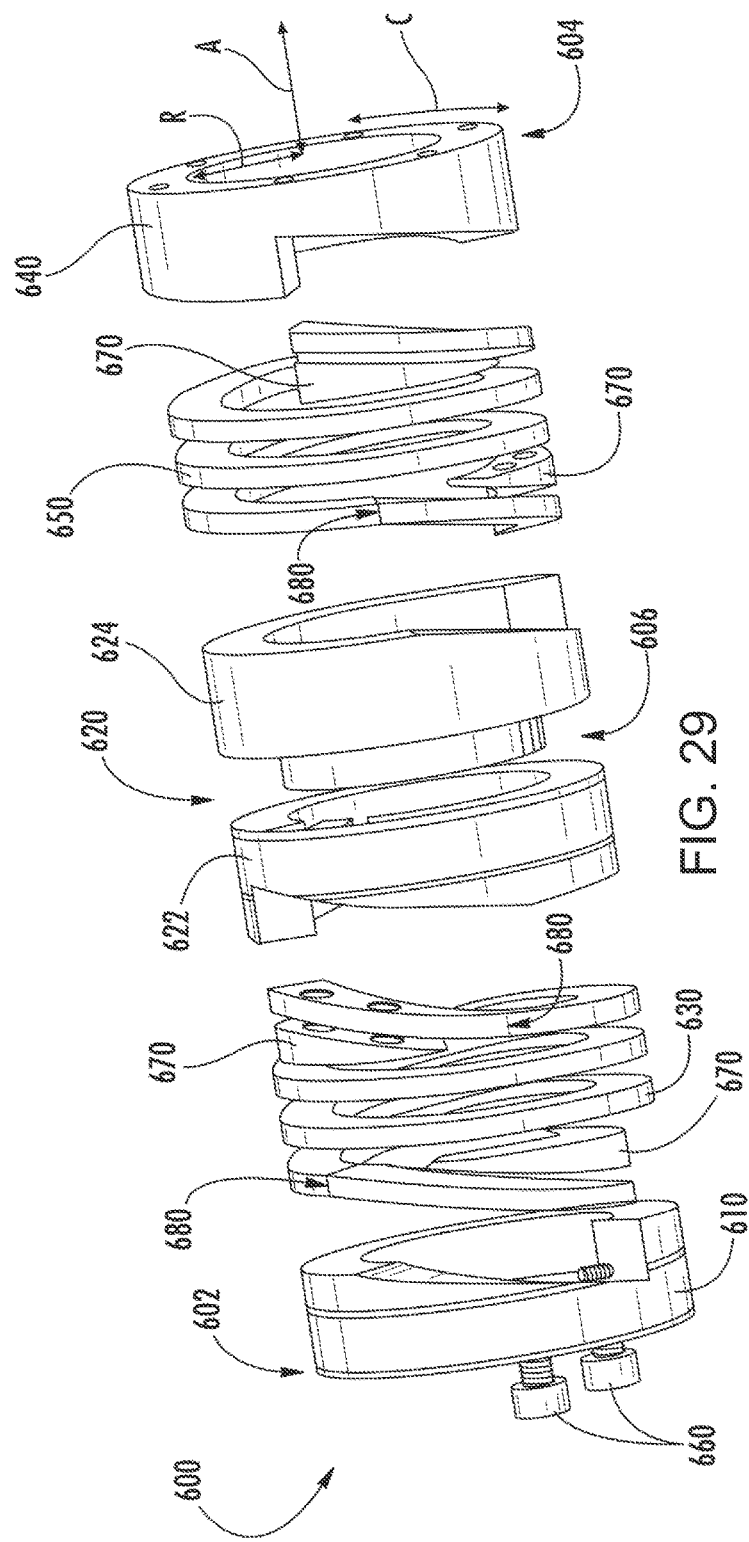
FIG. 29 provides an exploded view of the exemplary spring assembly of FIG. 27.

FIG. 27 provides a perspective view of a spring assembly 600 according to an exemplary embodiment of the present subject matter. FIG. 28 provides a section view of spring assembly 600. FIG. 29 provides an exploded view of spring assembly 600. Spring assembly 600 may be used in any suitable linear compressor. For example, spring assembly 600 may be used in linear compressor 100 (FIG. 4) to couple inner back iron assembly 130 to casing 110. Thus, spring assembly 600 may be used in lieu of machined spring 120 in linear compressor 120. However, as discussed in greater detail below, spring assembly 600 includes similar components and features as machined spring 120. Thus, spring assembly 600 may operate in a similar manner to machined spring 120 described above to assist with coupling inner back iron assembly 130 to casing 110. As may be seen in FIGS. 27, 28 and 29, spring assembly 600 extends between a first end portion 602 and a second end portion 604, e.g., along the axial direction A. A middle portion 606 of spring assembly 600 is positioned, e.g., equidistant along the axial direction A, between first and second end portions 602 and 604 of spring assembly 600.

Spring assembly 600 includes a first cylindrical portion 610, a second cylindrical portion 620, a first helical portion 630, a third cylindrical portion 640 and a second helical portion 650. First cylindrical portion 610 is positioned at or adjacent first end portion 602 of spring assembly 600, and second cylindrical portion 620 is positioned at or adjacent middle portion 606 of spring assembly 600. Third cylindrical portion 640 is positioned at or adjacent second end portion 604 of spring assembly 600. First helical portion 630 of spring assembly 600 extends between and couples first and second cylindrical portions 610 and 620 of spring assembly 600, e.g., along the axial direction A. Similarly, second helical portion 650 of spring assembly 600 extends between and couples second and third cylindrical portions 620 and 640 of spring assembly 600, e.g., along the axial direction A.

As discussed above with reference to machined spring 120, first cylindrical portion 610 may be mounted or fixed to casing 110 at first end portion 102 of casing 110. Thus, first cylindrical portion 610 may be positioned at or adjacent first end portion 102 of casing 110. Third cylindrical portion 640 may be mounted or fixed to casing 110 at second end portion 104 of casing 110, e.g., to cylinder assembly 111 of casing 110. Thus, third cylindrical portion 640 may be positioned at or adjacent second end portion 104 of casing 110. Second cylindrical portion 620 may be positioned within and fixed to inner back iron assembly 130. Second cylindrical portion 620 may also be positioned equidistant from first and third cylindrical portions 610 and 640, e.g., along the axial direction A.

As may be seen in FIGS. 27 and 28, first helical portion 630 extends, e.g., along the axial direction A, between first and second cylindrical portions 610 and 620 and couples first and second cylindrical portions 610 and 620 together. Similarly, second helical portion 650 extends, e.g., along the axial direction A, between second and third cylindrical portions 620 and 640 and couples second and third cylindrical portions 620 and 640 together. Thus, second cylindrical portion 620 is suspended between first and third cylindrical portions 610 and 640 with first and second helical portions 630 and 650.

First and second helical portions 630 and 650 and first, second and third cylindrical portions 610, 620 and 640 of spring assembly 600 are discrete components of spring assembly 600, e.g., such that first, second and third cylindrical portions 610, 620 and 640 are formed of or with separate pieces of material that are mounted or fixed to one another. As an example, first and second helical portions 630 and 650 and first, second and third cylindrical portions 610, 620 and 640 of spring assembly 600 may each be formed of or with a separate or discrete piece of metal, such as steel, or other elastic material, that are mounted to one another to construct or assemble spring assembly 600.

First and second helical portions 630 and 650 and first, second and third cylindrical portions 610, 620 and 640 may be mounted to one another or assembled together using any suitable method or mechanism. For example, first helical portion 630 may be riveted, fastened, brazed, welded, insert-casted, clinched, press-fit or adhered to first and second cylindrical portions 610 and 620, and second helical portion 650 may be riveted, fastened, brazed, welded, insert-casted, clinched, press-fit or adhered to second and third cylindrical portions 620 and 640. In particular, as shown in FIGS. 28 and 29, spring assembly 600 may include a plurality of fasteners 660 for coupling first and second helical portions 630 and 650 and first, second and third cylindrical portions 610, 620 and 640 together. Certain fasteners of fasteners 660 extend through first cylindrical portion 610 into first helical spring 630 in order to mount first helical spring 630 to first cylindrical portion 610. Certain fasteners of fasteners 660 also extend through second cylindrical portion 620 into first helical spring 630 in order to mount first helical spring 630 to second cylindrical portion 620. Fasteners 660 also couple second cylindrical portion 620 and third cylindrical portion 640 to second helical spring 650 in a similar manner.

As may be seen in FIGS. 27, 28 and 29, second cylindrical portion 620 includes a first cylindrical segment 622 and a second cylindrical segment 624 that define a joint 626 where first and second cylindrical segments 622 and 624 meet and/or are joined together. First cylindrical segment 622 is positioned at or adjacent first helical spring 630, and second cylindrical segment 624 is positioned at or adjacent second helical spring 650. First and second cylindrical segments 622 and 624 may be mounted or connected to each other using any suitable method or mechanism. For example, first and second cylindrical segments 622 and 624 may be press-fit, interference-fit, fastened, adhered, welded, brazed, threaded, etc. to each other. Sleeve 139 may also be positioned above or over joint 626 between first and second cylindrical segments 622 and 624 in order to assist with coupling first and second cylindrical segments 622 and 624 together.

As may be seen in FIGS. 27, 28 and 29, spring assembly 600 also includes a plurality of wedges 670. Wedges 670 assist with mounting first and second helical portions 630 and 650 to first, second and third cylindrical portions 610, 620 and 640. In particular, respective ones of fasteners 660 extend through first cylindrical portion 610 and first helical spring 630 into a first one of wedges 670 in order to mount first helical spring 630 to first cylindrical portion 610. Similarly, respective ones of fasteners 660 extend through first and second helical portions 630 and 650 and second and third cylindrical portions 620 and 640 into respective ones of wedges 670 in order to mount first helical spring 630 to second cylindrical portion 620 and second helical spring 650 to second and third cylindrical portions 620 and 640. Fasteners 660 may be threaded to only wedges 670. Thus, wedges 670 may clamp first and second helical portions 630 and 650 to first, second and third cylindrical portions 610, 620 and 640. In alternative exemplary embodiments, wedges 670 may integrally formed with first, second and third cylindrical portions 610, 620 and 640, and first and second helical portions 630 and 650 may be press-fit to first, second and third cylindrical portions 610, 620 and 640 with or at wedges 670. In particular, friction or interference between wedges 670 and first and second helical portions 630 and 650 and between first, second and third cylindrical portions 610, 620 and 640 and first and second helical portions 630 and 650 may hold or mount first and second helical portions 630 and 650 to first, second and third cylindrical portions 610, 620 and 640 when wedges 670 are integrally formed with first, second and third cylindrical portions 610, 620 and 640.

As may be seen in FIGS. 27 and 29, a pitch of first helical portion 630 changes at or adjacent first and second cylindrical portions 610 and 620. Similarly, a pitch of second helical portion 650 changes at or adjacent second and third cylindrical portions 620 and 640. Thus, first and second helical portions 630 and 650 may each include bends 680 where the pitch of the coils of first and second helical portions 630 and 650 changes. Bends 680 may assist with evenly or uniformly transferring force between first and second helical portions 630 and 650 and first, second and third cylindrical portions 610, 620 and 640. For example, bends 680 may permit elastic deformation of first and second helical portions 630 and 650 without interference from first, second and third cylindrical portions 610, 620 and 640. Thus, an upper surface 672 of each wedge of wedges 670 may be substantially (e.g., within about ten percent of) flush with a respective immediately adjacent outer surface of first, second and third cylindrical portions 610, 620 and 640.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A linear compressor, comprising:
    a casing having a first end portion and a second end portion, the casing having a cylinder assembly positioned at the second end portion of the casing, the cylinder assembly defining a chamber;
    a piston slidably received within the chamber of the cylinder assembly;
    a driving coil mounted to the casing;
    an inner back iron assembly positioned in the driving coil, the inner back iron assembly having an outer surface;
    a magnet mounted to the inner back iron assembly at the outer surface of the inner back iron assembly such that the magnet faces the driving coil; and
    a spring assembly comprising
        a first cylindrical portion mounted to the casing at the first end portion of the casing;
        a second cylindrical portion positioned within and fixed to the inner back iron assembly;
        a first helical portion mounted to the first and second cylindrical portions such that the first helical portion extends between and couples the first and second cylindrical portions together;
        a third cylindrical portion mounted to the casing at the second end portion of the casing; and
        a second helical portion mounted to the second and third cylindrical portions such that the second helical portion extends between and couples the second and third cylindrical portions together.

2. The linear compressor of claim 1, wherein the first, second and third cylindrical portions and the first and second helical portions of the spring assembly are positioned coaxially relative to one another.

3. The linear compressor of claim 1, wherein the first, second and third cylindrical portions and the first and second helical portions of the spring assembly are discrete from one another.

4. The linear compressor of claim 1, wherein the inner back iron assembly comprises an outer cylinder defining the outer surface of the inner back iron assembly and an inner surface positioned opposite the outer surface, the inner back iron assembly also comprising a sleeve positioned on the inner surface of the outer cylinder, the sleeve extending between the inner surface of outer cylinder and the second cylindrical portion of the spring assembly.

5. The linear compressor of claim 4, wherein a first interference fit between the sleeve and the outer cylinder fixes the sleeve to the outer cylinder at the inner surface of the outer cylinder, wherein a second interference fit between the sleeve and the second cylindrical portion of the spring assembly fixes the sleeve to the second cylindrical portion of the spring assembly.

6. The linear compressor of claim 4, wherein the second cylindrical portion comprises a first cylindrical segment positioned at the first helical portion and a second cylindrical segment positioned at the second helical portion, the sleeve positioned over a joint between the first and second cylindrical segments.

7. The linear compressor of claim 1, wherein the first helical portion is riveted, fastened, brazed, welded, insert-casted, clinched, press-fit or adhered to the first and second cylindrical portions and the second helical portion is riveted, fastened, brazed, welded, insert-casted, clinched, press-fit or adhered to the second and third cylindrical portions.

8. The linear compressor of claim 1, further comprising a plurality of fasteners, fasteners of the plurality of fasteners extending through the first cylindrical portion into the first helical portion in order to mount the first helical portion to the first cylindrical portion, fasteners of the plurality of fasteners extending through the second cylindrical portion into the first helical portion in order to mount the first helical portion to the second cylindrical portion, fasteners of the plurality of fasteners extending through the second cylindrical portion into the second helical portion in order to mount the second helical portion to the second cylindrical portion, fasteners of the plurality of fasteners extending through the third cylindrical portion into the second helical portion in order to mount the second helical portion to the third cylindrical portion.

9. The linear compressor of claim 8, further comprising a plurality of wedges, fasteners of the plurality of fasteners extending through the first cylindrical portion and the first helical portion into a first one of the plurality of wedges in order to mount the first helical portion to the first cylindrical portion, fasteners of the plurality of fasteners extending through the second cylindrical portion and the first helical portion into a second one of the plurality of wedges in order to mount the first helical portion to the second cylindrical portion, fasteners of the plurality of fasteners extending through the second cylindrical portion and the second helical portion into a third one of the plurality of wedges in order to mount the second helical portion to the second cylindrical portion, fasteners of the plurality of fasteners extending through the third cylindrical portion and the second helical portion into a fourth one of the plurality of wedges in order to mount the second helical portion to the third cylindrical portion.

10. The linear compressor of claim 9, wherein fasteners of the plurality of fasteners are threaded to only a respective one of the first, second, third and fourth wedges.

11. The linear compressor of claim 1, wherein the first helical portion of the spring assembly includes a first pair of helices that are separate from each other and the second helical portion of the spring assembly includes a second pair of helices that are separate from each other, each helix of the first pair of helices extending between the first and second cylindrical portions, each helix of the second pair of helices extending between the second and third cylindrical portions.

12. The linear compressor of claim 11, wherein the first and second pair of helices are oppositely wound.

13. A linear compressor defining a radial direction, a circumferential direction and an axial direction, the linear compressor comprising:
  a casing having a first end portion and a second end portion spaced along the axial direction, the casing having a cylinder assembly positioned at the second end portion of the casing, the cylinder assembly defining a chamber;
  a piston received within the chamber of the cylinder assembly such that the piston is slidable along a first axis within the chamber of the cylinder assembly;
  a spring assembly extending between the first and second end portions of the casing;
  an inner back iron assembly extending about the spring assembly along the circumferential direction, the inner back iron assembly fixed to the spring assembly at a middle portion of the spring assembly;
  a driving coil extending about the inner back iron assembly along the circumferential direction, the driving coil operable to move the inner back iron assembly along a second axis during operation of the driving coil, the first and second axes being substantially parallel to the axial direction;
  a magnet mounted to the inner back iron assembly such that the magnet is spaced apart from the driving coil by an air gap along the radial direction.

14. The linear compressor of claim 13, wherein the spring assembly comprises:
  a first cylindrical portion positioned at the first end portion of the casing;
  a second cylindrical portion positioned at the middle portion of the spring assembly;
  a first helical portion mounted to the first and second cylindrical portions such that the first helical portion extends between and couples the first and second cylindrical portions together;
  a third cylindrical portion positioned at the second end portion of the casing; and
  a second helical portion mounted to the second and third cylindrical portions such that the second helical portion extends between and couples the second and third cylindrical portions together.

15. The linear compressor of claim 14, wherein the first, second and third cylindrical portions and the first and second helical portions of the spring assembly are discrete from one another.

16. The linear compressor of claim 14, wherein the first helical portion is riveted, fastened, brazed, welded, insert-casted, clinched, press-fit or adhered to the first and second cylindrical portions and the second helical portion is riveted, fastened, brazed, welded, insert-casted, clinched, press-fit or adhered to the second and third cylindrical portions.

17. A spring assembly for a linear compressor, comprising:
  a first cylindrical portion;
  a second cylindrical portion;
  a first helical portion mounted to the first and second cylindrical portions such that the first helical portion extends between and couples the first and second cylindrical portions together;
  a third cylindrical portion positioned opposite the first cylindrical portion about the second cylindrical portion;
  a second helical portion mounted to the second and third cylindrical portions such that the second helical portion extends between and couples the second and third cylindrical portions together;
  a plurality of fasteners; and
  a plurality of wedges,
  wherein the first, second and third cylindrical portions and the first and second helical portions of the spring assembly are discrete from one another,
  wherein fasteners of the plurality of fasteners extending through the first cylindrical portion and the first helical portion into a first one of the plurality of wedges in order to mount the first helical portion to the first cylindrical portion, fasteners of the plurality of fasteners extending through the second-cylindrical portion and the first helical portion into a second one of the plurality of wedges in order to mount the first helical portion to the second cylindrical portion, fasteners of the plurality of fasteners extending through the second cylindrical portion and the second helical portion into a third one of the plurality of wedges in order to mount the second helical portion to the second cylindrical portion, fasteners of the plurality of fasteners extending through the third cylindrical portion and the second helical portion into a fourth one of the plurality of wedges in order to mount the second helical portion to the third cylindrical portion.

18. The spring assembly of claim 17, wherein a pitch of the first helical portion changes adjacent the first and second cylindrical portions, a pitch of the second helical portion changing adjacent the second and third cylindrical portions.

19. The spring assembly of claim 18, wherein an outer surface of each wedge of the plurality of wedges is substantially flush with a respective outer surface of the first, second and third cylindrical portions.

* * * * *